(12) United States Patent
Yakita

(10) Patent No.: US 7,580,199 B2
(45) Date of Patent: Aug. 25, 2009

(54) ZOOM LENS AND IMAGE TAKING SYSTEM HAVING THE SAME

(75) Inventor: Shinichiro Yakita, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/182,923

(22) Filed: Jul. 30, 2008

(65) Prior Publication Data

US 2009/0034097 A1 Feb. 5, 2009

(30) Foreign Application Priority Data

Jul. 31, 2007 (JP) ............................. 2007-199093

(51) Int. Cl.
*G02B 15/14* (2006.01)

(52) U.S. Cl. .................. 359/676; 359/683; 359/684; 359/685; 359/686; 359/689; 359/713; 359/714; 359/715; 359/716; 359/726; 359/737; 359/740

(58) Field of Classification Search ......... 359/676–679, 359/683–690, 713–716, 726, 737, 740
See application file for complete search history.

(56) References Cited

U.S. PATENT DOCUMENTS

| | | | | |
|---|---|---|---|---|
| 3,649,101 A * | 3/1972 | Straw et al. ................ | 359/686 |
| 4,749,268 A | 6/1988 | Moskovich et al. | |
| 6,687,059 B2 * | 2/2004 | Mihara ....................... | 359/681 |
| 7,209,175 B1 | 4/2007 | Kurokawa | |
| 7,345,706 B2 | 3/2008 | Kanayama | |
| 7,382,548 B2 * | 6/2008 | Kohno et al. ................ | 359/686 |
| 7,499,224 B2 * | 3/2009 | Nishimura .................. | 359/684 |
| 7,545,578 B2 * | 6/2009 | Sugita ........................ | 359/680 |
| 2003/0165019 A1 * | 9/2003 | Yamamoto .................. | 359/683 |
| 2003/0174232 A1 | 9/2003 | Yahagi | |
| 2005/0243436 A1 * | 11/2005 | Yasui ......................... | 359/676 |
| 2007/0030577 A1 * | 2/2007 | Yamamoto et al. .......... | 359/683 |
| 2007/0177277 A1 * | 8/2007 | Sugita ........................ | 359/687 |

FOREIGN PATENT DOCUMENTS

| | | |
|---|---|---|
| EP | 1653257 | 5/2006 |
| EP | 1720045 | 11/2006 |
| EP | 1762874 | 3/2007 |
| JP | 58-163908 | 9/1983 |
| JP | 59-000113 | 1/1984 |
| JP | 2002-365528 | 12/2002 |

* cited by examiner

*Primary Examiner*—Evelyn A. Lester
(74) *Attorney, Agent, or Firm*—Canon USA Inc IP Div

(57) ABSTRACT

A zoom lens includes a focus unit, a zoom unit, an aperture stop, and an imaging unit having a splitting element that are arranged in that order from an object side to an image side. The splitting element includes an incident surface for a light beam, a half mirror surface for splitting the light beam into reflected light and transmitted light, a splitting exit surface from which the reflected light is emitted, and an exit surface from which the transmitted light is emitted. The incident surface and the exit surface are perpendicular to an optical axis of the zoom lens. The ratio of the distance from the aperture stop to the exit surface and the equivalent air length from the aperture stop to an image plane of the zoom lens and the ratio of the effective diameters of the exit surface and the splitting exit surface are set properly.

6 Claims, 20 Drawing Sheets

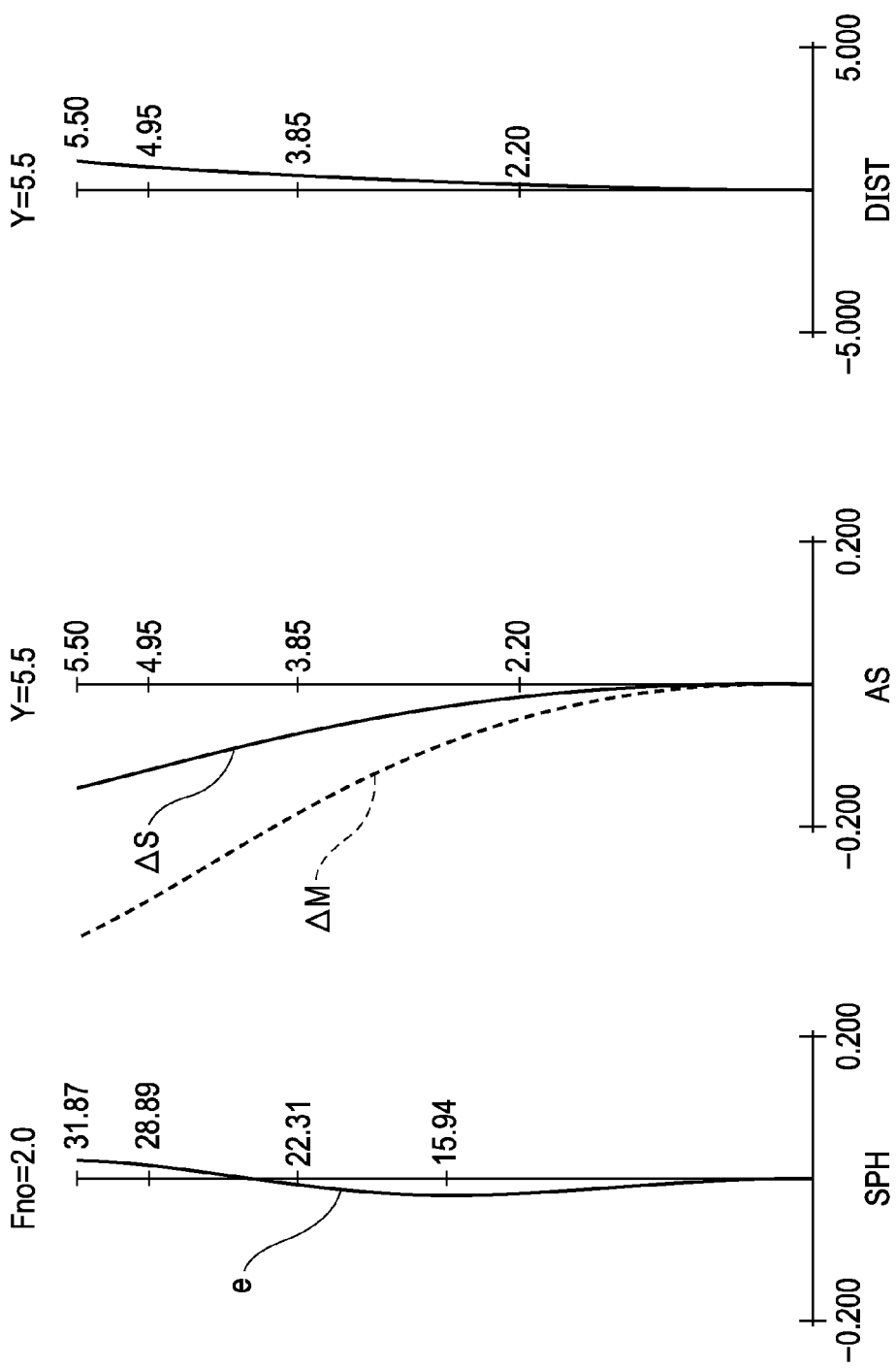

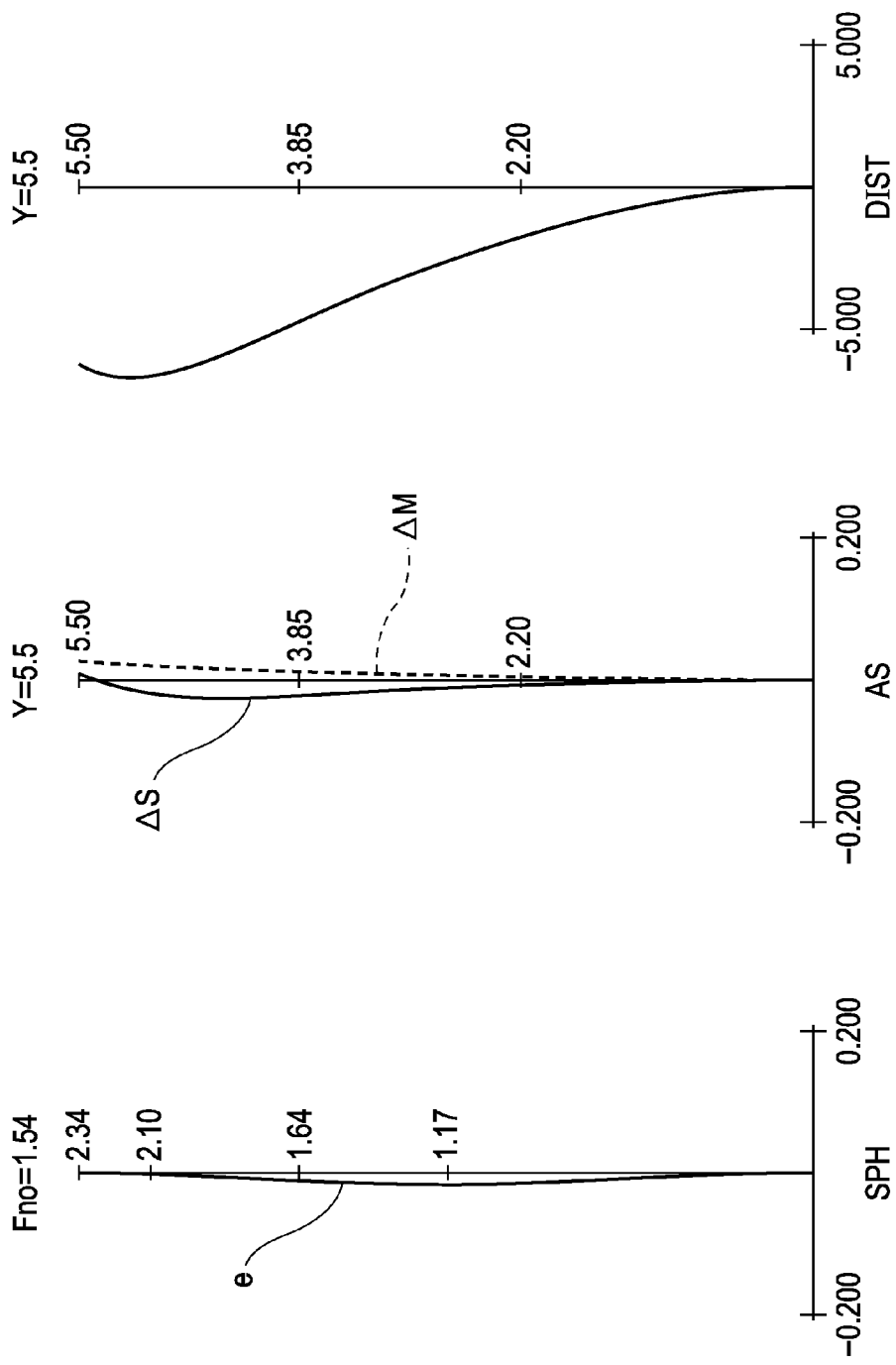

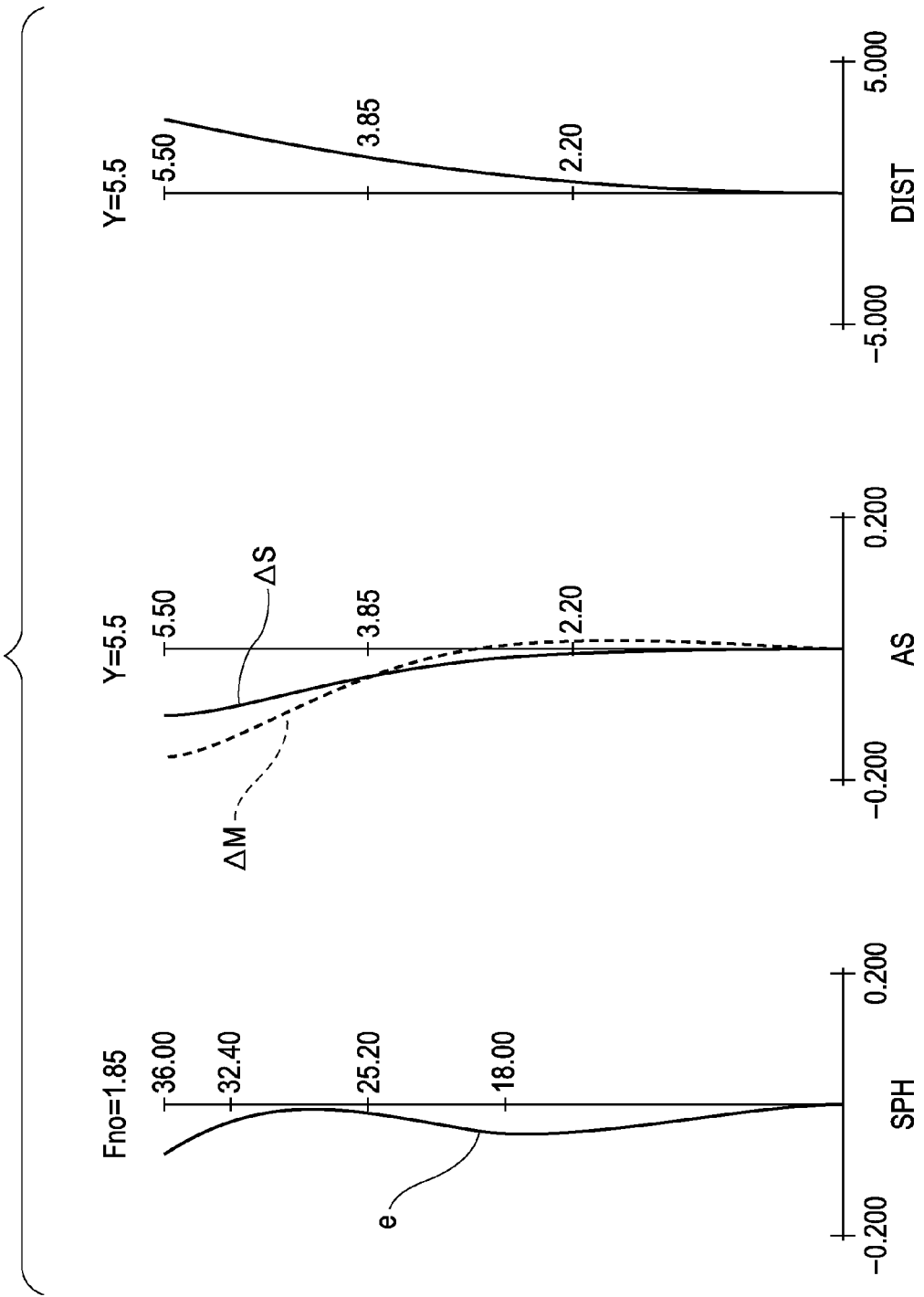

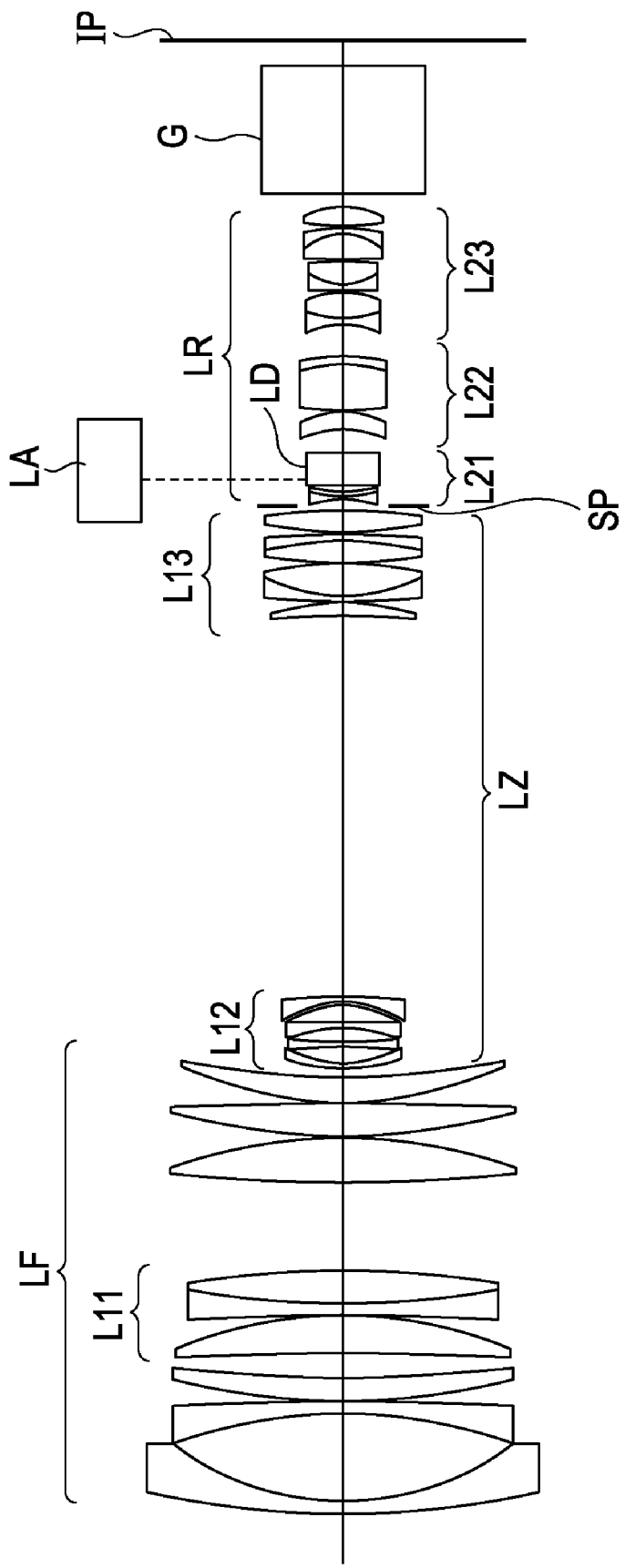

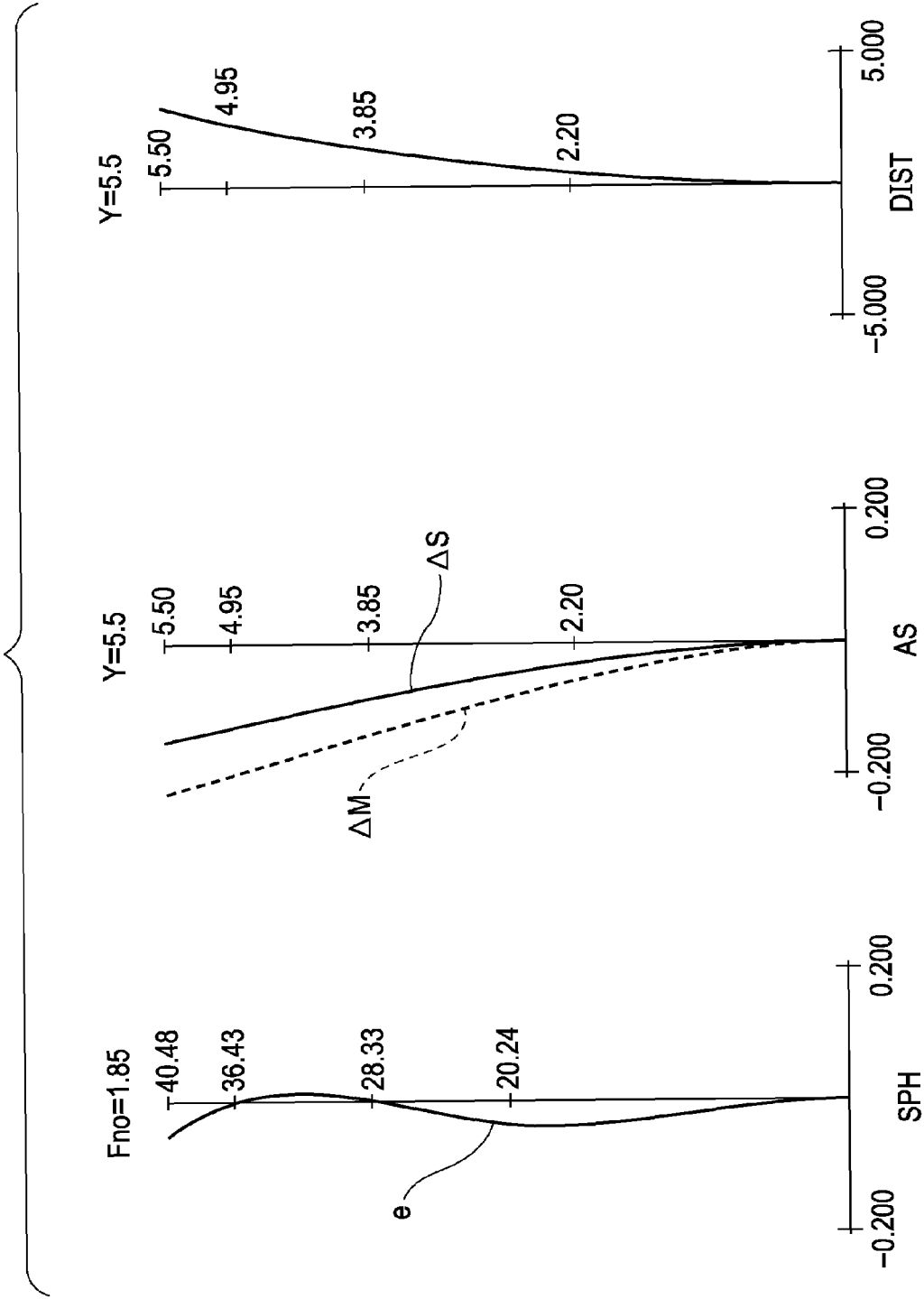

ZOOM LENS AND IMAGE TAKING SYSTEM HAVING THE SAME

BACKGROUND OF THE INVENTION

1. Field of the Invention

The present invention relates to a zoom lens for suitable use in a camera (image taking apparatus), such as a broadcast television camera or a video camera, and to an image taking system including the zoom lens.

2. Description of the Related Art

In recent years, broadcast television cameras have shifted to HDTV (high definition television) cameras, and image taking systems that can realize higher-definition images are demanded. There is also a demand to reduce the total size and weight of the image taking system.

In order to meet these demands, the definition of image pickup elements has been increased, and the performance (resolution) of zoom lenses used in image taking optical systems has been increased. This makes it possible to take images having high frequency components.

However, since the focal depth of the image taking optical system decreases with the increase in resolution, fine focus adjustment is required near the in-focus position (or best image plane).

In the case of manual focusing, a user of the camera performs focusing while viewing a relatively small screen such as a view finder. In this method, it is difficult to accurately adjust the focus.

For this reason, there are strong demands for image taking optical systems having a high-accuracy autofocus function (auto focus detecting function).

Autofocus methods are roughly classified into active autofocus methods and passive autofocus methods.

In an active autofocus method, a ranging system (measuring system) is provided separately from an image taking system. Distance information about an object is obtained, for example, by emitting infrared light from the ranging system toward the object and receiving the infrared light reflected by the object.

The active autofocus method is not suitable for use in an image taking system of a television camera, since the system takes an image of a subject provided at a long distance and is required to have high mobility.

In contrast, Japanese Patent Laid-Open No. 2002-365528 discloses a passive autofocus method in which a part of a lens unit in an image taking optical system or an image pickup element is driven (wobbled) along the optical axis by a small amplitude so as to detect the contrast (sharpness) of a taken image for focusing. This method can obtain a signal for determining the direction of the best focus position (in-focus position), and is called a contrast method (so-called hill-climbing autofocus method).

In the method disclosed in Japanese Laid-Open No. 2002-365528, a prism for taking out a part of image taking light is provided near an eyepiece window of the finder so that auto focusing can be performed over the entire image-taking angle of view.

In another passive autofocus method, a part of a light beam traveling in the optical path of a picture taking optical system is split by a splitting element (beam splitting element), and the split part is focused onto an image pickup element for focus detection so as to obtain a focus signal.

Methods of thus obtaining a focus signal by using a splitting optical system (focusing optical system) different from the image taking optical system are widely known, as disclosed in U.S. Pat. Nos. 7,209,175 and 7,345,706 and U.S. Patent Application Publication No. 2003/0174232.

In these methods, in which a splitting optical system is provided separately from the image taking optical system, it is possible to obtain a focus signal without deteriorating the quality of taken images.

When the splitting element for splitting a part of a light beam is provided in the optical path of the image taking optical system and the direction of the in-focus position is determined using the splitting optical system separate from the image taking optical system, operation of seeking the in-focus position is not reflected in the taken image.

However, the addition of the splitting optical system in the optical path of the image taking optical system increases the total length of the lens. In addition, this also increases the weight of the lens, and reduces mobility of the image taking system. Further, the effective diameter of the lens increases, and the position of the exit pupil becomes close to the imaging position. For example, when the image taking system is applied to a 3-CCD television camera having a color separation optical system, white shading occurs, and it is difficult to obtain high optical performance.

For this reason, when the splitting element is provided in the image taking optical path, it is important to minimize the optical path length of the splitting element.

In some zoom lenses for television cameras, a lens unit in a relay optical system (imaging unit) is partly inserted and removed into and from the optical path in exchange for another lens unit (extender lens), thereby changing the focal length range of the entire lens system.

In this case, the f-number of the entire lens system is changed by insertion or removal of the extender lens, and the focal depth also changes therewith. When the focal depth changes, it is difficult to obtain a high focus detection accuracy.

SUMMARY OF THE INVENTION

A zoom lens according to an embodiment of the present invention includes a focus unit including a focus lens unit; a zoom unit including a zooming lens unit; an aperture stop configured to adjust a light quantity; and an imaging unit including a lens unit that does not move for zooming. The focus unit, the zoom unit, the aperture stop, and the imaging unit are arranged in that order from an object side to an image side. The imaging unit includes a splitting element having an incident surface on which a light beam is incident from the aperture stop; a half mirror surface configured to split the light beam from the incident surface into reflected light and transmitted light; a splitting exit surface from which the reflected light from the half mirror surface is emitted after being reflected by a part of the incident surface; and an exit surface from which the transmitted light is emitted. The incident surface and the exit surface are perpendicular to an optical axis of the zoom lens. The following conditions are satisfied:

$$0.1 < \frac{d_P}{d_T} < 0.4 \quad (1)$$

$$0.25 < \frac{D_C}{D_B} < 0.77 \quad (2)$$

where $d_P$ represents a distance from the aperture stop to the exit surface of the splitting element, $d_T$ represents an equivalent air length from the aperture stop to an image plane of the entire zoom lens, $D_B$ represents an effective diameter of the exit surface of the splitting element, and $D_C$ represents an effective diameter of the splitting exit surface of the splitting element.

Further features of the present invention will become apparent from the following description of exemplary embodiments with reference to the attached drawings.

BRIEF DESCRIPTION OF THE DRAWINGS

FIGS. 8A and 8B include aberration diagrams of the zoom lens at a wide angle end and a telephoto end, respectively, in the second exemplary embodiment.

FIGS. 11A and 11B include aberration diagrams of the zoom lens at a wide angle end and a telephoto end, respectively, in the third exemplary embodiment.

FIG. 13 is a cross-sectional view of a zoom lens according to a fourth exemplary embodiment.

FIGS. 14A and 14B include aberration diagrams of the zoom lens at a wide angle end and a telephoto end, respectively, in the fourth exemplary embodiment.

DESCRIPTION OF THE EMBODIMENTS

A zoom lens for a television camera and an image taking system having the zoom lens according to a first exemplary embodiment of the present invention suppress deterioration of focus detecting accuracy when an extender lens is inserted and removed into and from the optical path. The zoom lens and the image taking system also reduce the increase in total lens length when a part of an image taking light beam is split by a splitting element provided in an image taking optical path.

The zoom lens and the image taking system according to the exemplary embodiment also allow high-accuracy focus detection without affecting the focus detection accuracy even in a case in which an extender lens is inserted into and removed from an imaging unit when the split beam is used for autofocus detection.

A zoom lens and an image taking system having the zoom lens according to a first exemplary embodiment of the embodiment of the present invention will now be described.

Figure 1:
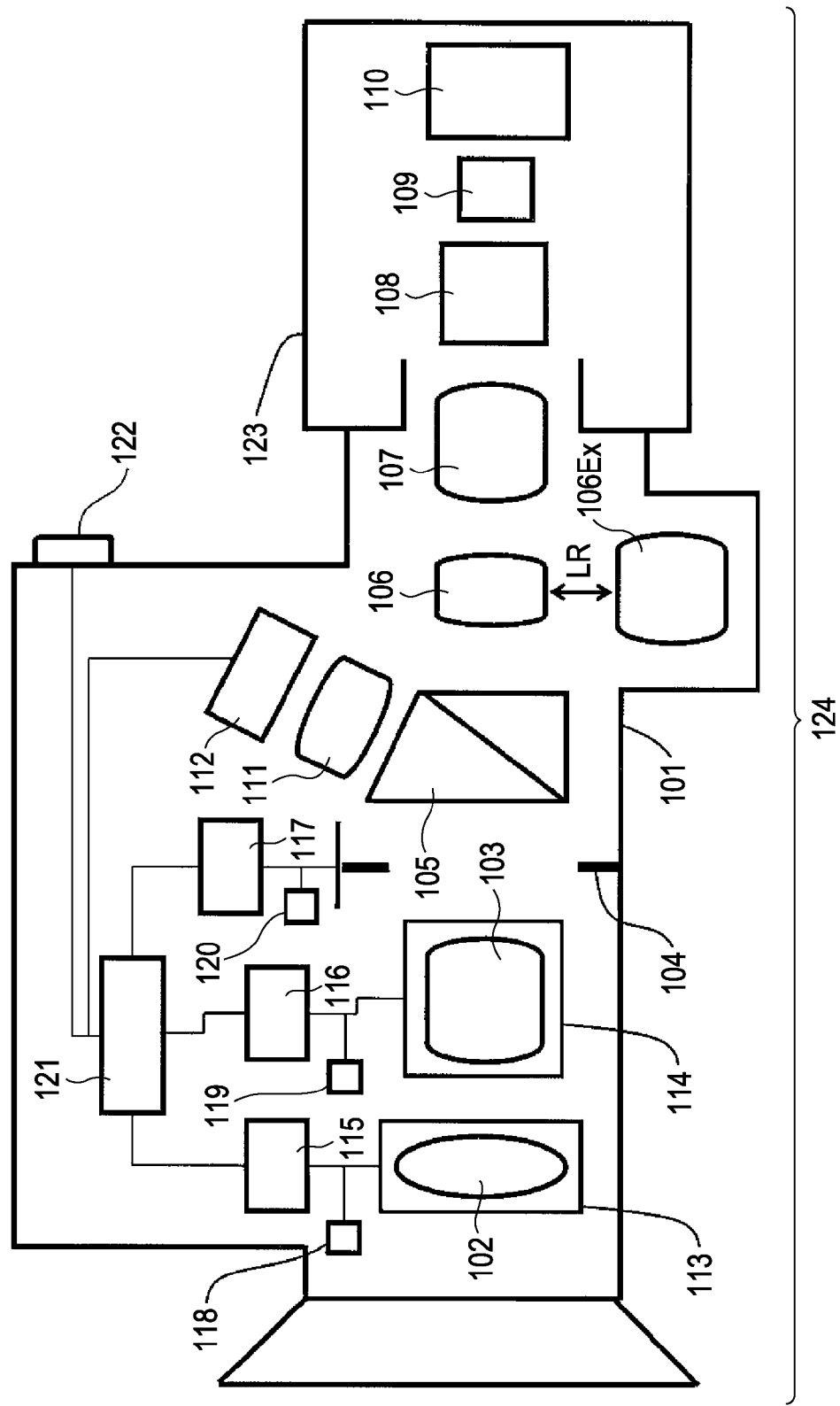
FIG. 1 is a schematic view showing the principal part of an image taking system according to the present invention.

FIG. 1 is a schematic view showing the principal part of an image taking system 124 according to the first exemplary embodiment that is applied to a television camera system. Referring to FIG. 1, the image taking system 124 includes a zoom lens 101 and a camera 123 serving as an image taking device. The zoom lens 101 forms an image of a subject (object), and is releaseably (interchangeably) securable to the camera (camera body) 123, the latter including an image pickup element for photoelectrically converting a subject image into electrical signals. By attaching the zoom lens 101 to the camera 123, the image taking system 124 is formed.

The zoom lens 101 includes a focus unit (a lens unit including a lens unit for focusing) 102, a zoom unit (a lens unit for zooming) 103, an aperture stop 104 for adjusting the light quantity, and an imaging unit LR.

The focus unit 102 has a focus lens unit. The zoom unit 103 has a lens unit including a variator that moves on the optical axis for zooming, and a compensator that moves on the optical axis in order to compensate for image plane variation due to zooming.

The zoom lens 101 also includes a splitting element 105 that splits a part of image taking light passing through the image taking system 124 toward a focus lens unit 111. The zoom lens 101 further includes a lens unit 106 that can be inserted and removed into and from the optical axis of the zoom lens 101, an extender lens (extender optical system) 106Ex that can be inserted and removed similarly, and an imaging lens unit 107 having an imaging function. The extender optical system 106Ex is replaced with the lens unit 106 so as to change the focal length of the entire system of the zoom lens 101. The imaging lens unit 107 does not move for focusing or zooming (it can move for purposes different from zooming).

The camera 123 includes a glass block 108 corresponding to an optical filter or a color separation prism, and an image pickup element (photoelectric conversion element) 109, such as a CCD sensor or a CMOS sensor, for receiving a subject image formed by the zoom lens 101. The camera 123 also includes a CPU 110 for controlling the entire camera 123.

A lens unit (focus lens unit) 111 for imaging guides the light beam split by the splitting element 105 to a photoelectric conversion element (focus detecting element) 112 for detecting the focus state. The photoelectric conversion element 112 receives the light guided by the focus lens unit 111, and outputs an AF signal. The focus lens unit 111 and the focus detecting element 112 constitute a focus detecting system that will be described below (the system may include other components). Depending on the splitting element 105 and other structures, the focus lens unit 111 may be omitted from the system).

Driving mechanisms 113 and 114, such as a helicoid and a cam, respectively drive the focus lens unit 102 and the zoom lens unit 103 along the optical axis. The driving mechanisms 113 and 114 can be driven electrically, manually, or by both methods.

Motors (driving units) 115, 116 and 117 electrically drive the driving mechanisms 113 and 114 and the aperture stop 104.

Detectors 118, 119 and 120, such as an encoder, a potentiometer, or a photosensor, detect the positions of the lens units 102 and 103 on the optical axis, and the diameter of the aperture stop 104.

A switch member 122 switches between auto focusing and manual focusing based on user input, and selects a mode in which auto focusing is always performed, or a mode in which auto focusing is performed only when directed by attached members. The switch member 122 includes a member (not shown) that directs which subject in an image field is subjected to auto focusing.

A CPU 121 controls the zoom lens 101, and calculates the in-focus position according to a signal obtained from the photoelectric conversion element 112.

An autofocus process performed by the image taking system 124 according to the first exemplary embodiment will now be described. First, the switch member 122 directs that auto focusing be performed on a desired subject.

In the zoom lens 101, a light beam split by the splitting element 105 is guided to the photoelectric conversion element 112 by the focus lens unit 111. By using positional information about the focus lens unit 102, the zoom lens unit 103, and the aperture stop 104 obtained by the detectors 118 to 120, as necessary, the CPU 121 calculates the in-focus position in the image pickup element 109 according to a signal obtained from the photoelectric conversion element 112. The focus unit 102 is moved by the driving mechanism 113 to the best focus position (in-focus position) calculated by the CPU 121, thereby achieving focusing.

In this case, the above-described autofocus operation can be performed always or only when directed by the switch member 122.

Figure 2:
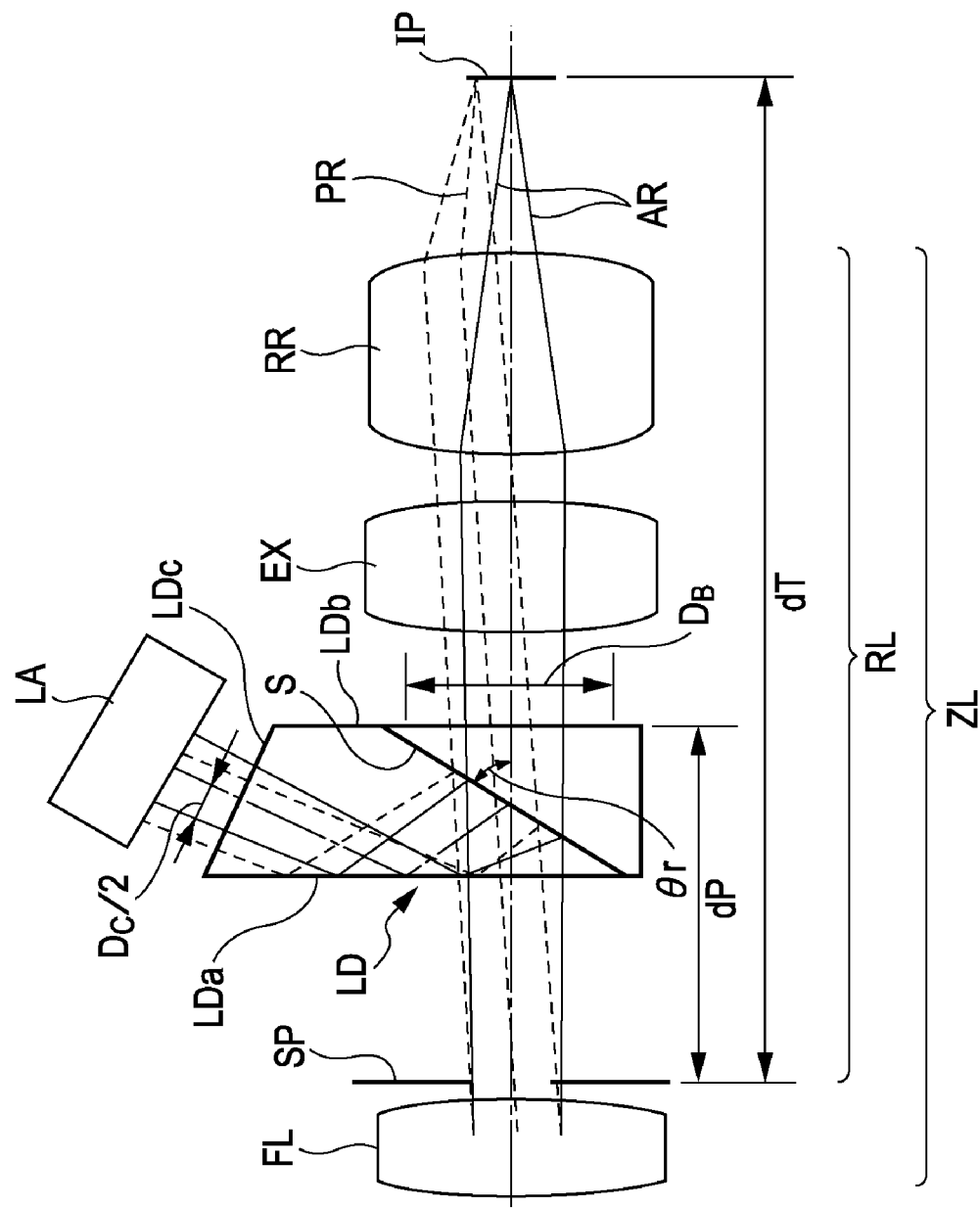
FIG. 2 is a schematic view showing the principal part of a zoom lens in the image taking system.

FIG. 2 is a schematic view showing the principal part of the zoom lens 101 shown in FIG. 1. In FIG. 2, components are arranged in the following order from the object side to the image side.

FL represents a lens unit including a focus portion and a zoom portion, SP represents an aperture stop, and LD represents a splitting element. EX represents a lens unit or an extender optical system (extender lens) that can be inserted into and removed from the optical axis, RR represents an imaging lens unit that does not move for zooming, and IP represents an image plane.

The components from the lens unit FL to the imaging lens unit RR constitute a zoom lens ZL. The components from the aperture stop SP to the imaging lens unit RR constitute an imaging unit (relay lens) RL. The splitting element LD is provided between the aperture stop SP and the imaging lens unit RR.

The splitting element LD has a reflective surface (half mirror surface) S, and guides a split light beam to a focus detecting system (detecting unit) LA provided on an emergent (exit) side of a splitting emergent (exit) surface so as to detect the in-focus position. The focus detecting system LA includes a lens unit and a focus detecting element. In FIG. 2, solid lines show axial rays that are focused on the center of the image plane IP, dotted lines show off-axis rays that are focused on the maximum image height of the image plane IP, and a one-dot chain line shows the optical axis. AR represents an axial ray passing through the outermost side (remote from the optical axis) of the entrance pupil when the f-number allows detection of the in-focus position by the focus detecting system LA, and PR represents an off-axis principal ray. A ray such as the axial ray AR or the off-axis principal ray PR, enters the splitting element LD, is partially split by the half mirror surface S, is totally reflected by an incident surface LDa of the splitting element LD, and is then guided to the focus detecting system LA.

θr represents the angle formed between the half mirror surface S and the optical axis La, and $d_P$ represents the distance from the aperture stop SP to an emergent (exit) surface LDb of the splitting element LD closest to the image plane IP along the optical axis La of the zoom lens ZL. Further, $d_T$ represents the distance from the aperture stop SP to the image plane IP (equivalent air length) along the optical axis La of the zoom lens ZL. The incident surface LDa and the emergent (exit) surface LDb are parallel to each other.

$D_B$ represents the effective diameter of the emergent (exit) surface LDb of the splitting element LD, and $D_C$ represents the effective diameter of a splitting emergent (exit) surface LDc of the splitting element LD facing the focus detecting system LA. The effective diameter Dc is provided when a light beam entering the focus detecting system LA is ensured over the entire image size of the zoom lens ZL at the f-number of the axial ray AR. In FIG. 2, $D_C$ is defined by an upper line of the off-axis ray, and the distance from the optical axis is expressed as $D_C/2$.

The equivalent air length refers to a value (length) obtained by dividing the length (axial length, optical path length) of the optical block, such as a prism, provided in the optical path between the final lens surface of the imaging unit RL and the image plane IP by the refractive index.

In this case, the first exemplary embodiment satisfies the following conditions:

$$0.1 < \frac{d_P}{d_T} < 0.4 \qquad (1)$$

$$0.25 < \frac{D_C}{D_B} < 0.77 \qquad (2)$$

The technical meaning of the above-described conditional expressions will now be described.

When the distance $d_T$ is too long with respect to the distance $d_P$ and the value is less than the lower limit in Conditional Expression 1, the total length of the zoom lens ZL becomes long and it is difficult to reduce the size and weight of the entire lens system. In contrast, when the distance $d_P$ is too short with respect to the distance $d_T$ and the value is less than the lower limit in Conditional Expression 1, it is difficult to ensure a sufficiently large thickness of the splitting element LD in the optical axis direction.

Consequently, the width of a split light beam guided to the focus lens unit 111 (FIG. 1) by the splitting element LD decreases, and therefore, accurate detection of the in-focus position is difficult, or the in-focus position can be detected only in a part of the entire image size of the image pickup element 109.

In contrast, when the distance $d_P$ is too long with respect to the distance $d_T$ and the value is more than the upper limit in Conditional Expression 1, the exit pupil becomes close to the imaging position, and white shading occurs. Therefore, it is difficult to obtain high optical performance.

When the distance $d_T$ is too short with respect to the distance $d_P$ and the value is more than the upper limit in Conditional Expression 1, it is difficult to ensure a sufficient clearance in which the extender lens Ex is inserted. Moreover, it is difficult to ensure a clearance in which the lens unit is moved to adjust a flange back and to perform macro image taking and a space for a holding mechanism for holding the lens unit.

When the effective diameter $D_C$ is too small with respect to the effective diameter $D_B$ and the value is less than the lower limit in Conditional Expression 2, the width of a beam split and guided to the focus lens unit 111 by the splitting element LD decreases. Therefore, accurate detection of the in-focus position is difficult, or the in-focus position can be detected only in a part of the entire image size of the image pickup element 109.

When the effective diameter $D_B$ is too large with respect to the effective diameter $D_C$ and the value is less than the lower limit in Conditional Expression 2, the diameter of the zoom lens ZL increases. Therefore, it is difficult to reduce the size and weight of the zoom lens ZL and to achieve high optical performance with a simple lens configuration.

In contrast, when the effective diameter $D_B$ is too small with respect to the effective diameter $D_C$ and the value is more than the upper limit in Conditional Expression 2, it is difficult to obtain an appropriate back focus and to achieve a large f-number in the zoom lens ZL.

Moreover, it is difficult to ensure high optical performance with a simple lens configuration. Further, when the extender lens EX is provided on the side of the splitting element LD facing the image plane IP, it is difficult to ensure a high a focal magnification in order to change the focal length at the extender lens EX.

When the effective diameter $D_C$ is too large with respect to the effective diameter $D_B$ and the value is more than the upper limit in Conditional Expression 2, it is difficult to reduce the size and weight of the focus lens unit 111.

In the first exemplary embodiment, the front lens unit or splitting optical system including the splitting element LD is provided on the side of the imaging unit (relay lens unit) RL closest to the object side. Preferably, the lens unit (extender optical system Ex) that is inserted and removed into and from the optical axis La of the zoom lens ZL so as to change the focal length, and the imaging lens unit RR that does not move for focusing or zooming are also provided.

With the above-described structure, the angle of view of the split light beam introduced in the focus lens unit 111 does not change even when the extender lens Ex is inserted into and removed from the optical path of the zoom lens ZL.

This means that the angle of view of the subject whose focus position is to be detected does not change even if the image-taking angle of view is changed by inserting the extender lens Ex into (or removing it from) the optical path of the zoom lens ZL when the in-focus position is detected by the focus lens unit 111.

When the f-number of the zoom lens ZL is changed by insertion or removal of the extender lens Ex, the focal depth also changes with the change of the f-number.

This means that the accuracy required to detect the in-focus position changes. However, since the light beam guided to the focus lens unit 111 for detecting the in-focus position is split by the splitting element LD on a side closer to the object side than the extender lens Ex, the focal depth does not change.

For example, when the extender lens Ex for doubling the focal length and doubling the f-number is inserted in the optical path, the focal depth of the zoom lens ZL is doubled. Therefore, the required focusing accuracy is decreased to half.

In contrast, the focal depth of the focus lens unit 111 does not change even when the extender lens Ex is inserted. In other words, in the autofocus system for detecting the in-focus position with the focus lens unit 111, when the extender lens Ex is inserted in the optical path, the focusing accuracy is doubled.

When the focus lens unit 111 detects the in-focus position by, for example, a phase difference method, the in-focus-position detection range for the subject is not changed by inserting the extender lens Ex in the optical path. Herein, a phase difference method (a phase difference detection method) refers to a method for measuring the focus state by detecting the phase difference.

Preferably, the reflective surface S of the splitting element LD provided at an angle θr to the optical axis splits the entire effective area of the image taking beam. Since the image taking beam is thereby uniformly split, a natural image can be taken. In other words, if only a part of the effective area of the image taking beam is split, transmittance varies in the taken image, and this makes the image visually undesirable.

Preferably, the reflective surface S splits the entire effective area of the image taking beam, and guides only a part of the split beam to the focus detecting system LA. Since this can reduce the effective diameter $D_C$, the sizes and weights of the splitting element LD and the focus lens unit 111 can be reduced easily.

With the components having the above-described structures, the thickness of the zoom lens in the optical axis direction can be reduced, and the size and weight of the image taking system can be reduced easily. Further, the width of the beam to be guided to the optical system after splitting can be ensured, and the in-focus position can be detected easily and accurately.

In the first exemplary embodiment, it is preferable that the image taking system satisfy the following conditions:

$$-0.21 < \alpha < 0.22 \tag{3}$$

$$0.05 < \frac{d_P \cdot \tan\overline{\alpha}}{D_B} < 0.22 \tag{4}$$

$$53 < \theta_r < 67 \tag{5}$$

where α represents the incident angle (in radians) of the axial marginal ray on the splitting element LD, $\overline{\alpha}$ represents the incident angle of the principal ray on the maximum image height of the splitting element LD when the aperture stop is open, and $\theta_r$ represents the angle (in degrees) formed by the optical axis and the half mirror surface S in the clockwise direction.

The technical meaning of Conditional Expressions 3 to 5 described above will now be explained.

When the value is more than the upper limit in Conditional Expression 3, the diameter of the zoom lens ZL increases, and it is difficult to reduce the size and weight of the zoom lens ZL and to ensure high optical performance with a simple lens configuration.

Moreover, the exit pupil becomes close to the imaging position, and this causes white shading. Further, the position in the optical path of the zoom lens ZL where the extender lens Ex is inserted and removed becomes more sensitive to the optical performance, and this makes manufacturing difficult.

In contrast, when the value is less than the lower limit in Conditional Expression 3, it is difficult to obtain an appropriate back focus and to realize a large f-number in the zoom lens ZL. Moreover, it is difficult to ensure high optical performance with a simple lens configuration. When the extender lens Ex is provided on the side of the splitting element LD facing the image plane, it is difficult to ensure a high a focal magnification in order to change the focal length at the extender lens Ex.

Further, the position in the optical path of the zoom lens ZL where the extender lens Ex is inserted and removed becomes more sensitive to the optical performance, and this makes manufacturing difficult.

When the value is more than the upper limit in Conditional Expression 4, the position of the exit pupil becomes close to the imaging position, white shading occurs, and it is difficult to obtain high optical performance. Further, it is difficult to ensure high optical performance with a simple lens configuration.

When the value is less than the lower limit in Conditional Expression 4, the total lens length increases, and the diameter of the zoom lens ZL increases. This makes it difficult to reduce the size and weight and to obtain high optical performance with a simple lens configuration.

When the value is more than the upper limit in Conditional Expression 5, the width of the light beam split and guided by the splitting element LD to the focus lens unit 111 decreases. Therefore, it is difficult to accurately detect the in-focus position, or the range of the entire image size of the image pickup element 109 where the in-focus position can be detected is reduced.

In contrast, when the value is less than the lower limit in Conditional Expression 5, the position of the exit pupil becomes close to the imaging position, white shading occurs, and it is difficult to obtain high optical performance with a simple lens configuration. Moreover, the optical path length of the splitting element LD with respect to the lens unit 111 increases, and this makes size and weight reduction difficult.

More preferably, the numerical values in Conditional Expressions 1 to 5 described above are set within the following ranges:

$$0.11 < \frac{d_P}{d_T} < 0.39 \quad (1a)$$

$$0.26 < \frac{D_C}{D_B} < 0.76 \quad (2a)$$

$$-0.20 < \alpha < 0.21 \quad (3a)$$

$$0.06 < \frac{d_P \cdot \tan\overline{\alpha}}{D_B} < 0.21 \quad (4a)$$

$$54 < \theta_r < 66 \quad (5a)$$

Preferably, the imaging lens unit in the imaging unit RL that does not move during zooming is movable along the optical axis so as to perform at least one of macro image taking and adjustment of the flange back.

In this case, it is possible to adjust the flange back in a plurality of cameras that are different in flange back because of manufacturing error. Moreover, the function of adjusting the flange back can provide a high accuracy in detecting the in-focus position in a plurality of cameras. The macro image-taking function allows applications to various image taking manners.

The zoom lens according to the first exemplary embodiment can be attached to various cameras having an image pickup element (light-receiving element) that receives an image taken by the zoom lens.

Zoom lenses according to exemplary embodiments of the present invention will be described below.

Figure 3:
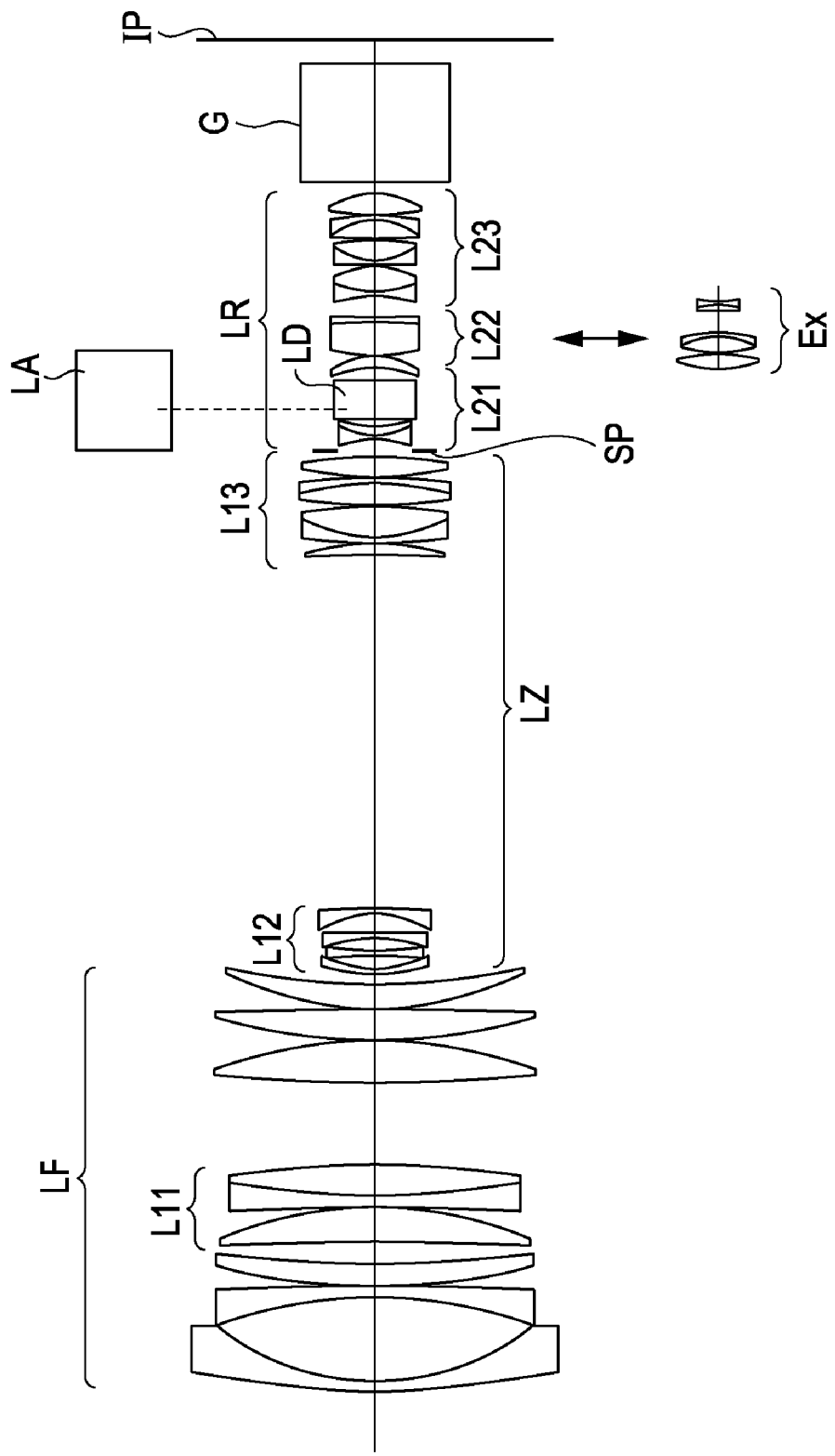
FIG. 3 is a cross-sectional view of a zoom lens according to a first exemplary embodiment.

FIG. 3 is a cross-sectional view of the zoom lens at a wide angle end (short focal length) according to the first exemplary embodiment of the present invention.

Figure 4A:
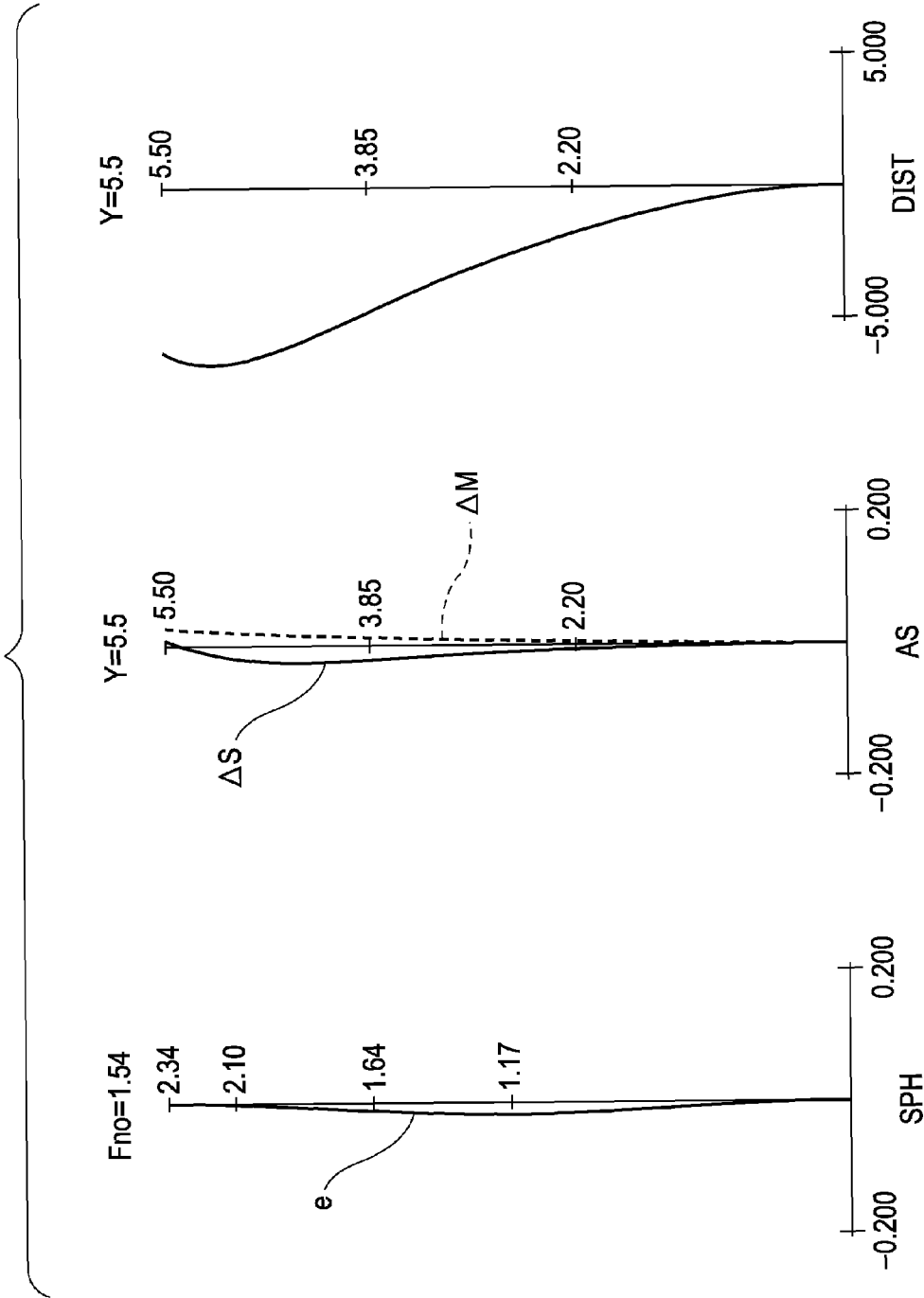
FIGS. 4A and 4B include aberration diagrams of the zoom lens at a wide angle end and a telephoto end, respectively, in the first exemplary embodiment.
Figure 4B:
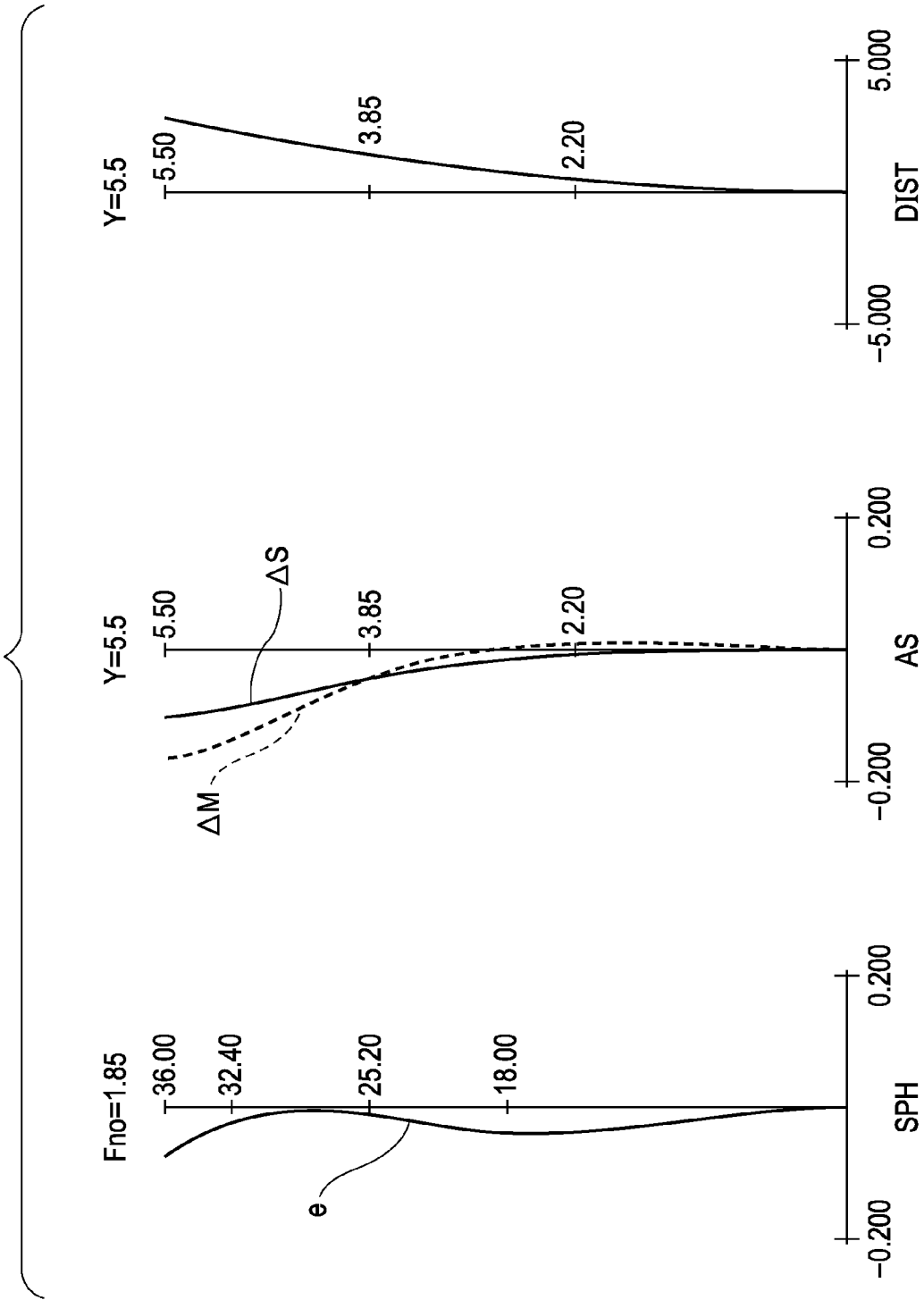

FIGS. 4A and 4B include aberration diagrams of the zoom lens at the wide angle end and the telephoto end (long focal length) of the zooming range, respectively, in the first exemplary embodiment.

Figure 5A:
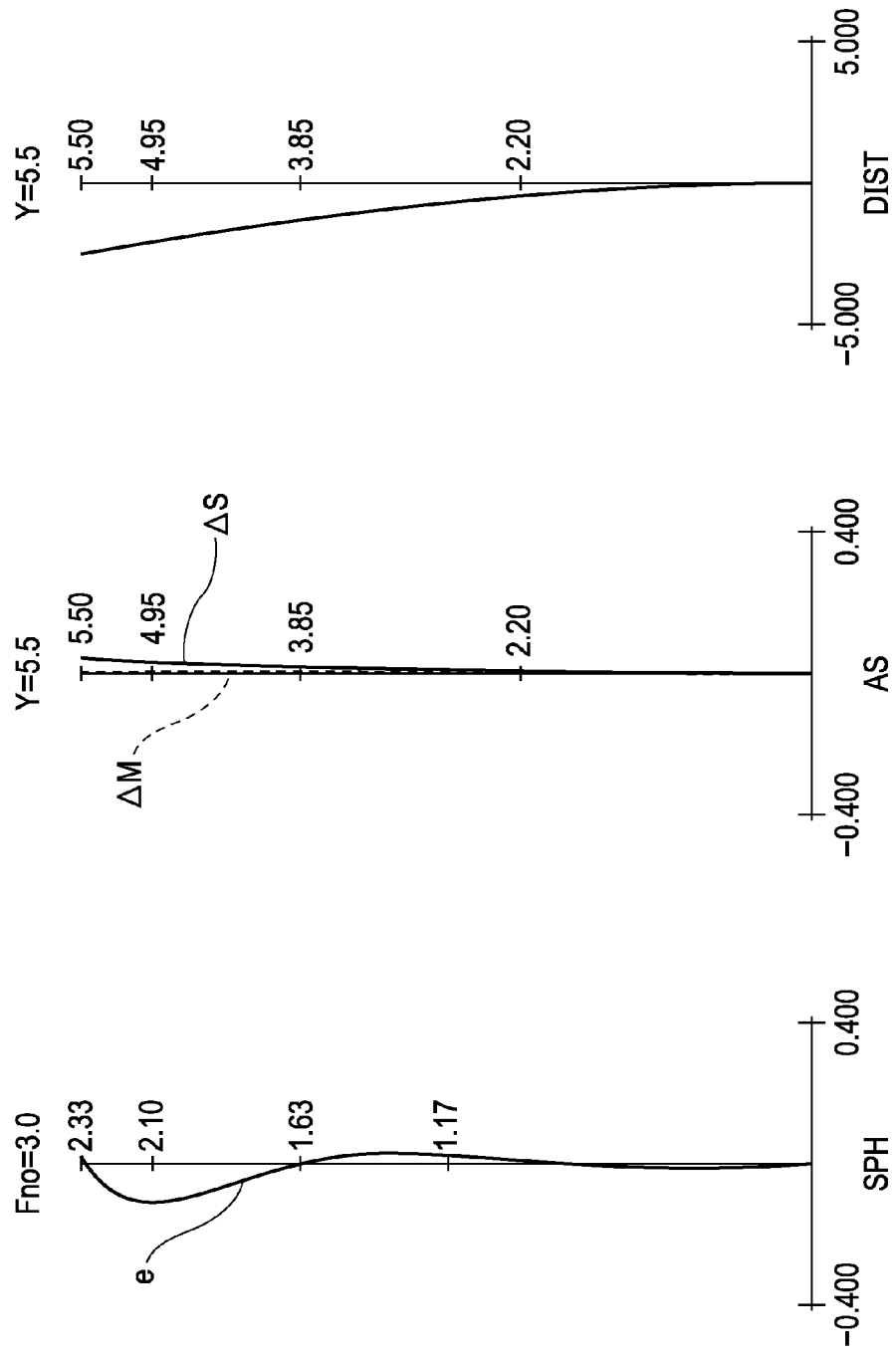
FIGS. 5A and 5B include aberration diagrams of the zoom lens at the wide angle end and the telephoto end, respectively, when an extender lens is inserted in the zoom lens according to the first exemplary embodiment.
Figure 5B:
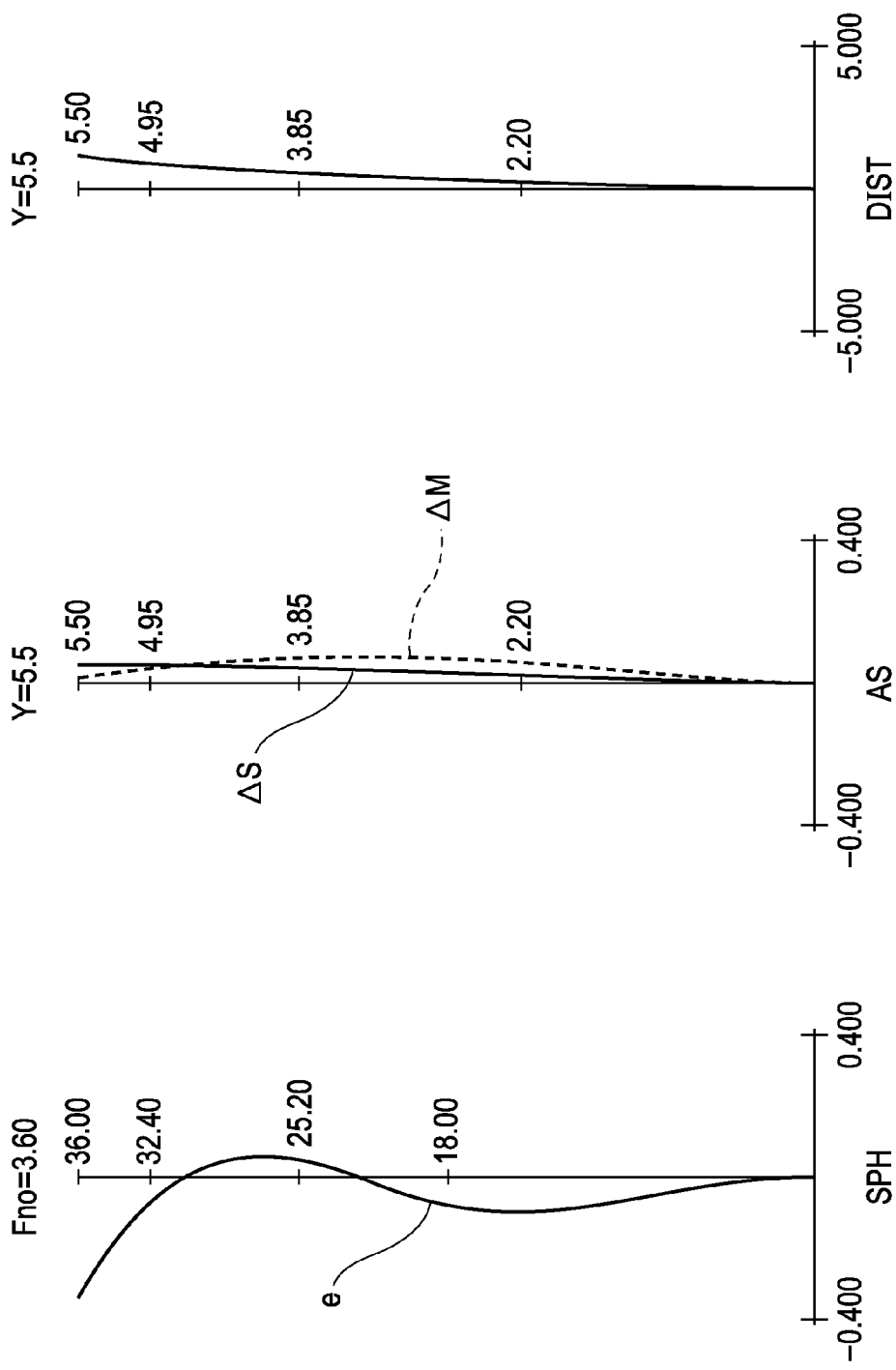

FIGS. 5A and 5B include aberration diagrams of the zoom lens at the wide angle end and the telephoto end of the zooming range, respectively, when an extender lens is inserted in the first exemplary embodiment.

Figure 6:
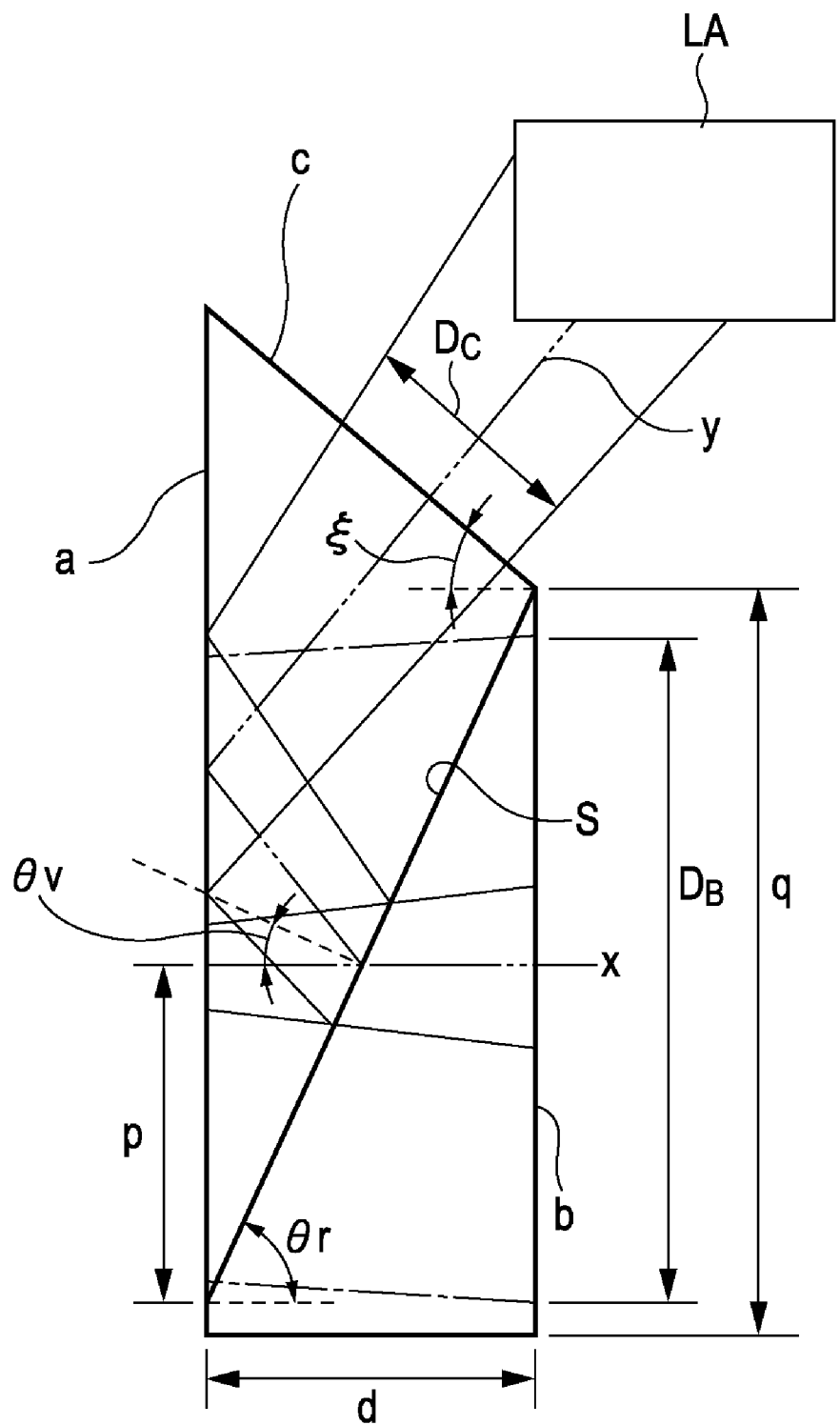
FIG. 6 is a cross-sectional view of a splitting element in the first exemplary embodiment.

FIG. 6 is a cross-sectional view of the principal part of a splitting element shown in FIG. 3.

Figure 7:
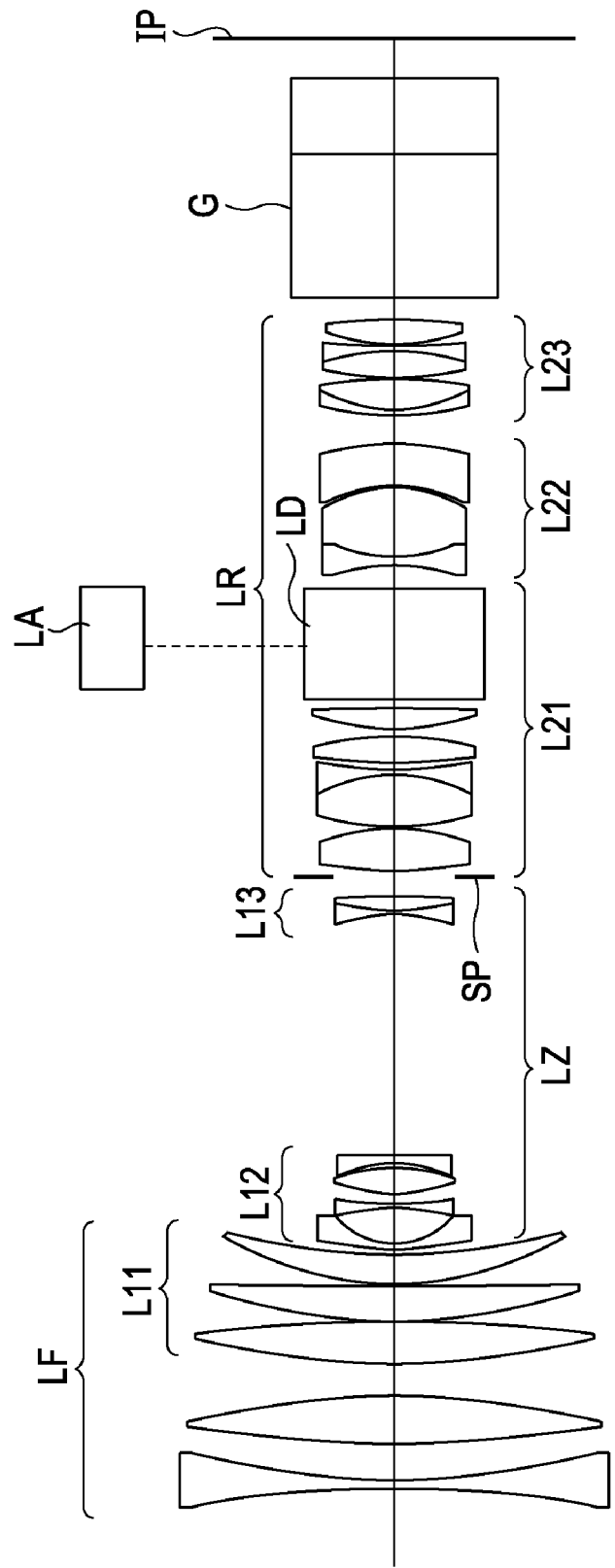
FIG. 7 is a cross-sectional view of a zoom lens according to a second exemplary embodiment.

FIG. 7 is a cross-sectional view of a zoom lens at a wide angle end of the zooming range according to a second exemplary embodiment of the present invention.

Figure 8A:
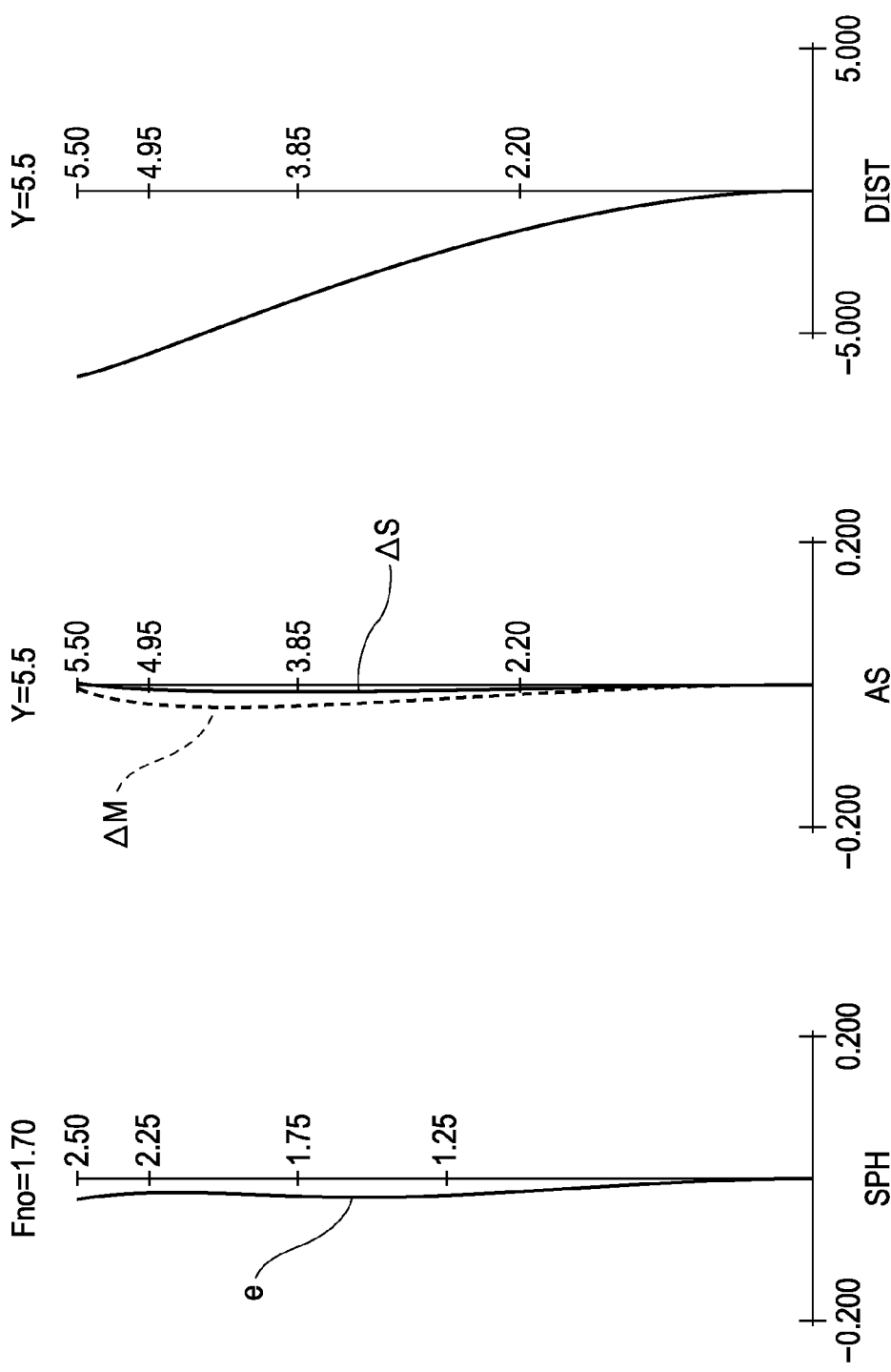

FIGS. 8A and 8B include aberration diagrams of the zoom lens at the wide angle end and a telephoto end, respectively, in the second exemplary embodiment.

Figure 9:
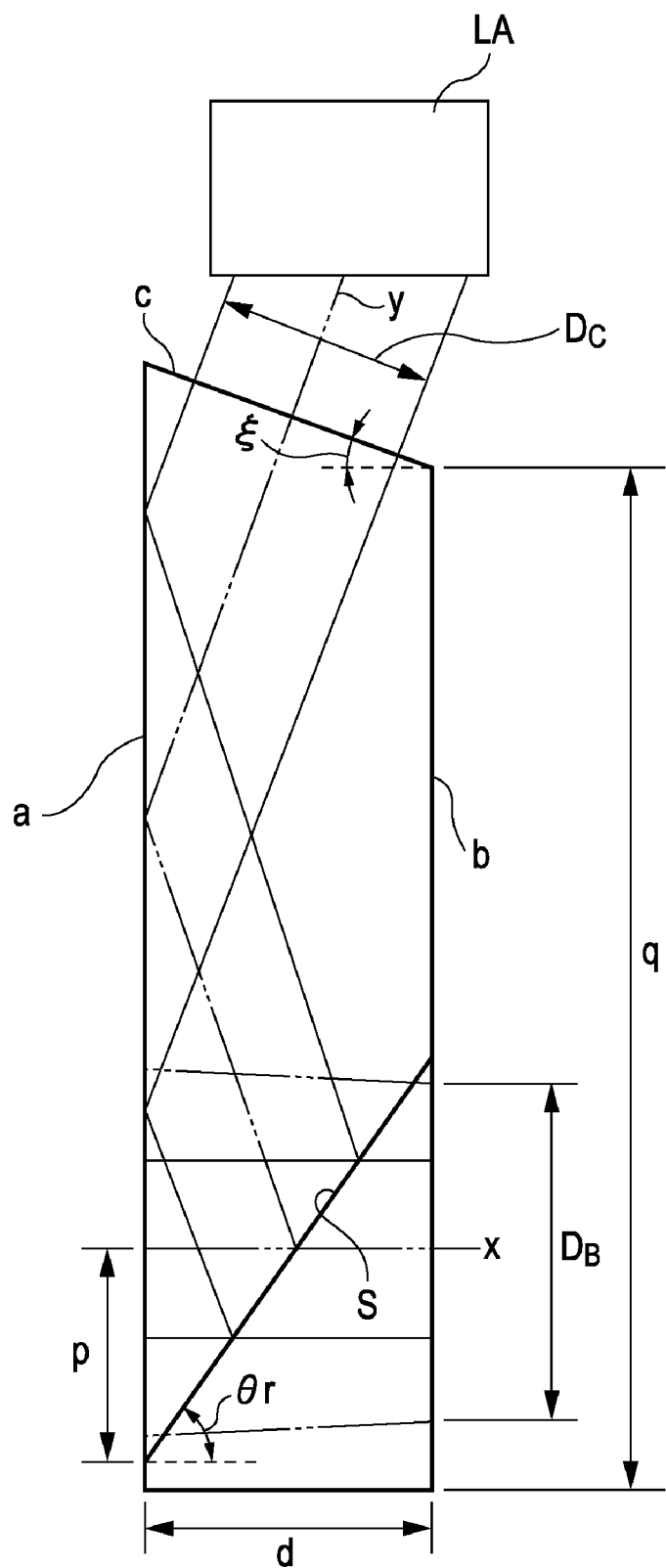
FIG. 9 is a cross-sectional view of a splitting element in the second exemplary embodiment.

FIG. 9 is a cross-sectional view of the principal part of a splitting element shown in FIG. 7.

Figure 10:
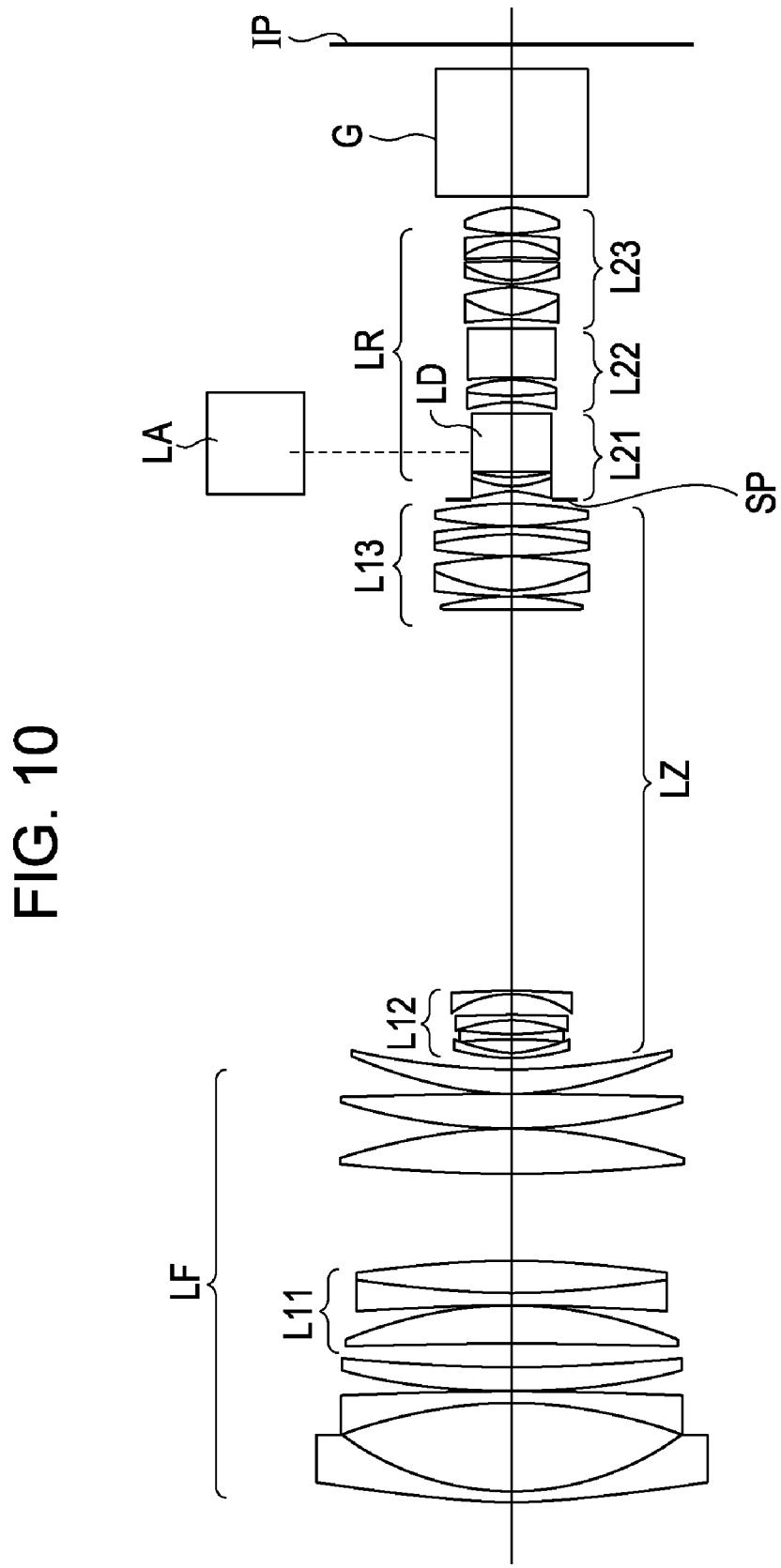
FIG. 10 is a cross-sectional view of a zoom lens according to a third exemplary embodiment.

FIG. 10 is a cross-sectional view of a zoom lens at a wide angle end according to a third exemplary embodiment of the present invention.

FIGS. 11A and 11B include aberration diagrams of the zoom lens at the wide angle end and a telephoto end, respectively, in the third exemplary embodiment.

Figure 12:
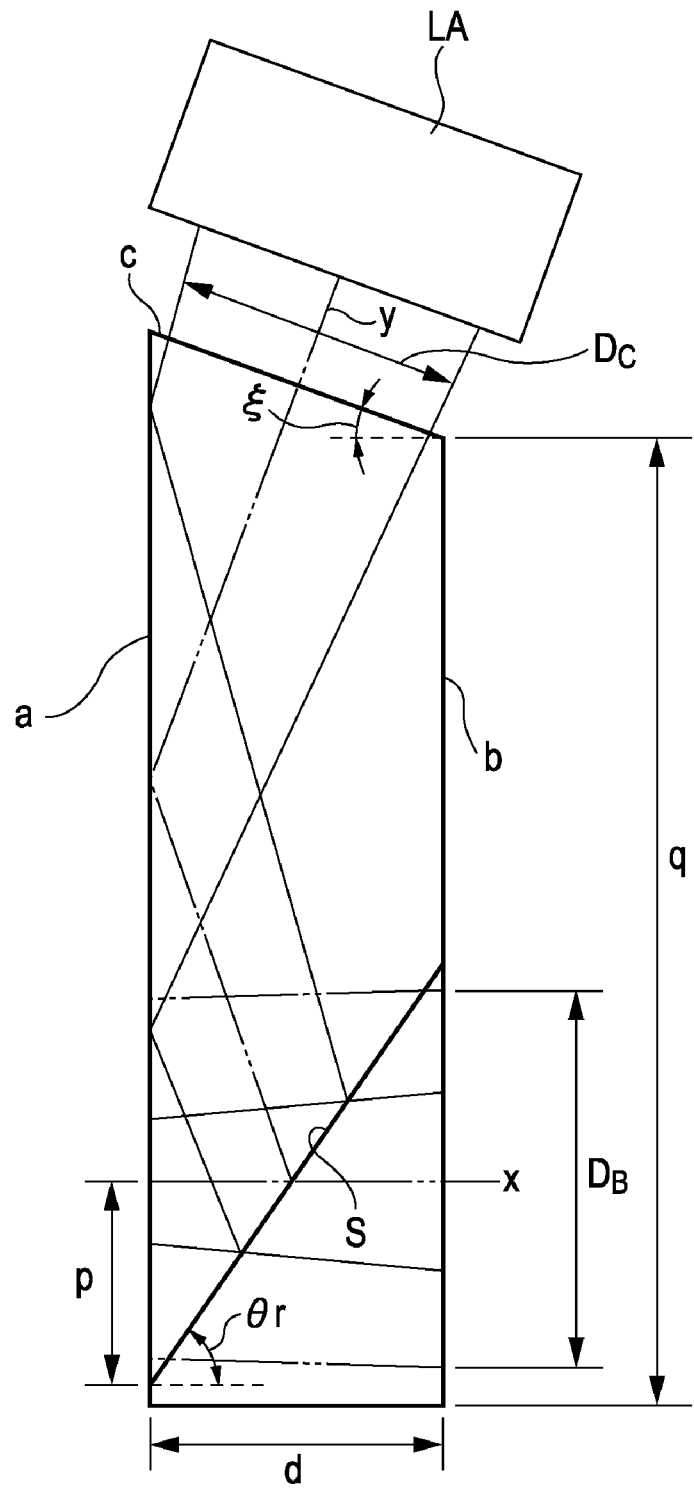
FIG. 12 is a cross-sectional view of a splitting element in the third exemplary embodiment.

FIG. 12 is a cross-sectional view of the principal part of a splitting element shown in FIG. 10.

FIG. 13 is a cross-sectional view of a zoom lens at a wide angle end according to a fourth exemplary embodiment of the present invention.

Figure 14A:
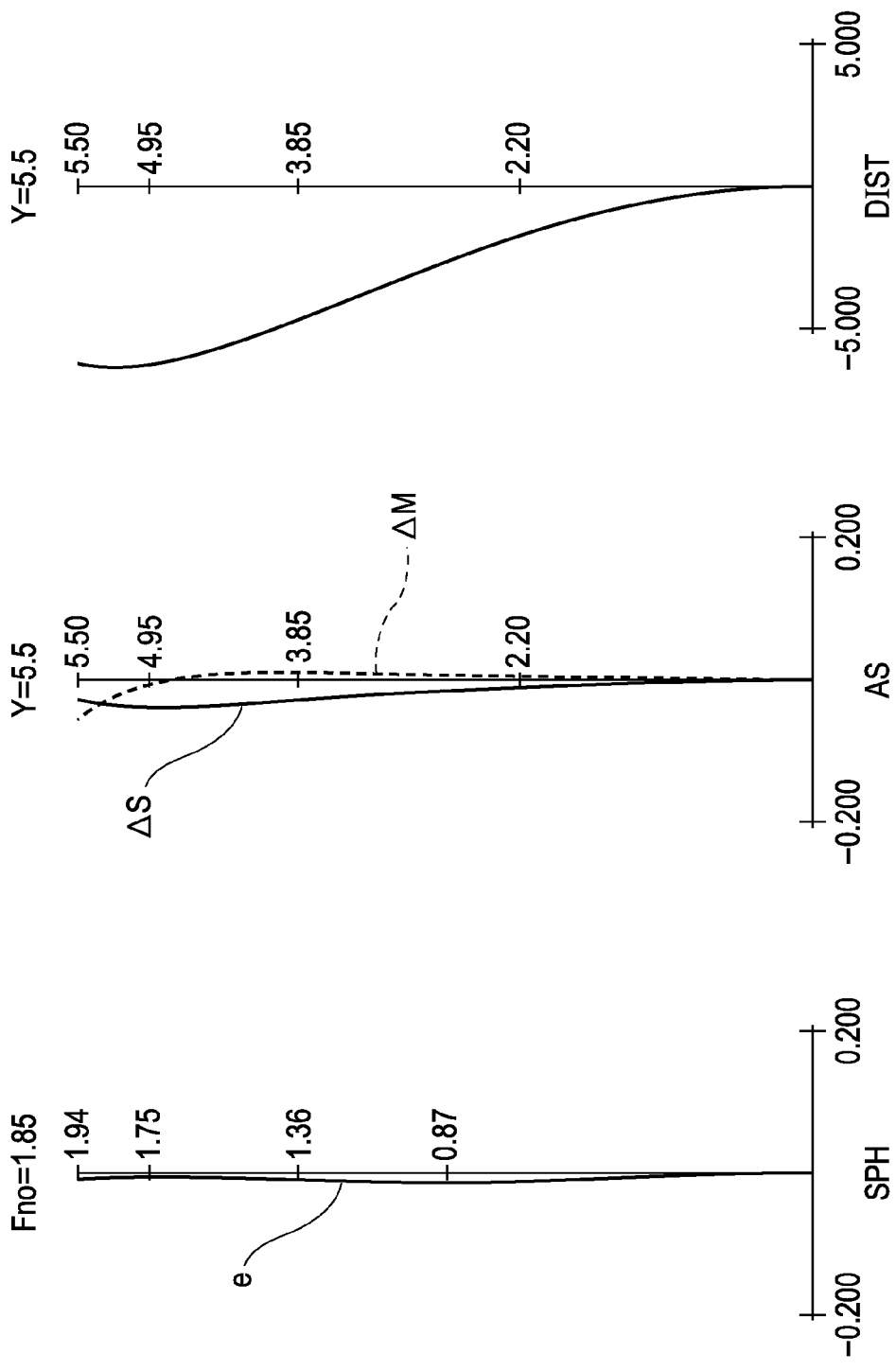

FIGS. 14A and 14B include aberration diagrams of the zoom lens at the wide angle end and a telephoto end, respectively, in the fourth exemplary embodiment.

Figure 15:
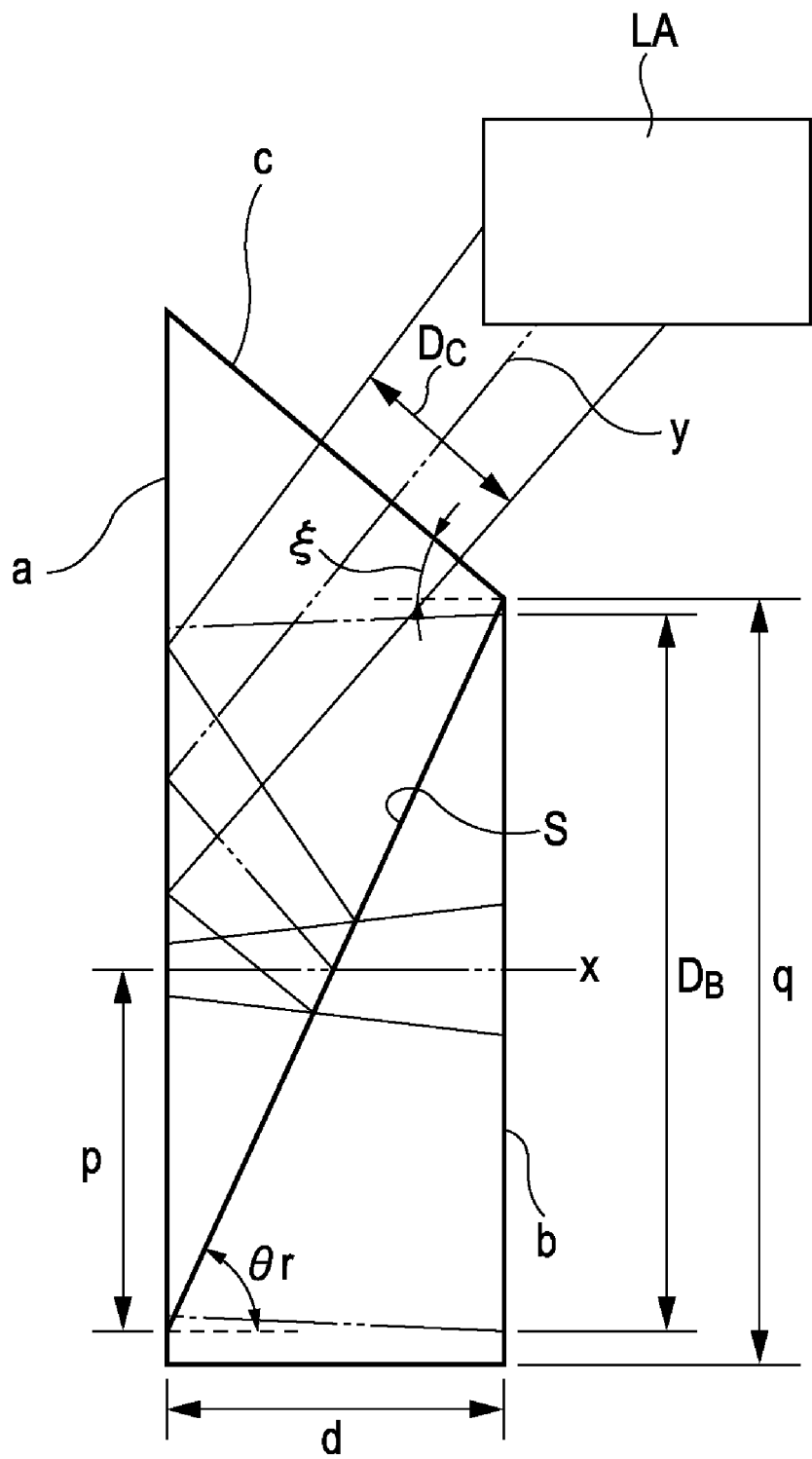
FIG. 15 is a cross-sectional view of a splitting element in the fourth exemplary embodiment.

FIG. 15 is a cross-sectional view of the principal part of a splitting element shown in FIG. 13.

In the exemplary embodiments, the zoom lens is interchangeably attached to a television camera or a video camera (image taking device), and forms a part of the image taking system shown in FIG. 1.

In the cross-sectional views of the lens, the left side is an object side (front side) and the right side is an image side (rear side). FIG. 3 corresponds to the following first numerical example, FIG. 7 corresponds to the following second numerical example, FIG. 10 corresponds to the following third numerical example, and FIG. 13 corresponds to the following fourth numerical example.

The zoom lens includes a focus unit LF having a focus lens unit L11, and a zoom unit LZ consisting of or including two lens units (a variator lens unit L12 and a compensator lens unit L13) that move on the optical axis during zooming. The focus unit LF and the zoom unit LA are arranged in that order from the object side to the image side.

The zoom lens also includes an aperture stop SP for limiting the quantity of light passing therethrough, and an imaging unit LR having a plurality of imaging lens units that do not move for zooming.

The imaging unit LR includes a lens unit (front lens unit) L21, a lens unit L22, and an imaging lens unit L23. The front lens unit L21 includes a splitting element LD for splitting an incident beam into a plurality of optical paths.

A focus detecting system (detecting unit) LA detects the in-focus position. The focus detecting system LA is used to obtain a focus detection signal of the zoom lens ZL by a known method using a part of the image taking beam split by the splitting element LD.

For example, an autofocus detecting device used in the exemplary embodiments adopts a phase difference method.

The autofocus detecting device using this method includes a secondary imaging lens that forms subject images corresponding to a plurality of regions of the exit pupil of the zoom lens using light beams emitted from the regions, and light receiving portions respectively provided at positions where a plurality of subject images are formed. The light quantity distribution of each subject image is converted into electric signals by the corresponding light receiving portion. By using these electric signals, focus information about the zoom lens is calculated from the positional relationship among the subject images by a calculation unit.

The lens unit L22 is inserted into and removed from the optical path in exchange for another lens unit (extender lens unit) Ex in order to change the focal length range of the entire system.

In the second to fourth exemplary embodiments, the extender lens unit Ex can be exchanged for the lens unit L22, similarly to the first exemplary embodiment.

The extender lens unit Ex is inserted in the image taking optical path so as to double the focal length of the entire system toward the long focus side.

The imaging lens unit L23 has a positive refractive power. The entirety or a part of the imaging lens unit L23 has at least one of a macro image taking function and a flange-focal-distance adjusting function.

An optical block G corresponds to a color separation prism, an optical filter, a face plate, a crystal low-pass filter, or an infrared cut-off filter.

An image plane IP corresponds to an image pickup surface of a solid-state image pickup element (photoelectric conversion element), such as a CCD sensor or a CMOS sensor, when the image taking optical system is used in a television camera or a video camera.

In the aberration diagrams, spherical aberration (SPH), curvature of field and astigmatism (AS), and distortion (DIST) are shown in that order from the left. Further, e represents an e-line, ΔM and ΔS respectively represent a meridional image plane and a sagittal image plane of the e-line, Fno represents the f-number, and Y represents the image height.

Splitting elements used in the exemplary embodiments will now be explained.

FIG. 6 is a schematic view of the splitting element LD used in the first exemplary embodiment. In FIG. 6, x represents the optical axis of the zoom lens, y represents the optical axis of the optical system in the focus detecting system LA, and S represents a reflective surface (half mirror surface) for splitting the light beam.

An incident surface a and an emergent (exit) surface b of the splitting element LD are perpendicular to the optical axis x. The incident surface a and the emergent (exit) surface b are arranged parallel to each other so as to define a thickness d in the direction of the optical axis x.

Further, a splitting emergent (exit) surface c is provided perpendicular to the optical axis y and at an angle ξ to the optical axis x. The reflective surface S splits an incident beam into transmitted light and reflected light at a predetermined ratio.

The normal to the reflective surface S and the optical axis x form an angle $\theta_y$. The reflective surface S and the optical axis x form an angle $\theta_r$.

Further, q represents the length of the emergent (exit) surface b in a direction perpendicular to the optical axis x, and p represents the length, in the direction perpendicular to the optical axis x, of a portion of the incident surface a between the optical axis x and the one end of the reflective surface S.

A one-dot chain line shows an axial marginal ray, and a solid line shows an effective diameter when a beam incident on the focus detecting system LA is ensured over the entire image size of the zoom lens ZL in a case in which the f-number of the zoom lens ZL allows the in-focus position to be detected by the focus detecting system LA. The reflective surface S is provided at an oblique angle to the optical axis x with consideration of the direction in which the optical path is to be split (optical axis y). The ratio of reflection and transmission by the reflective surface S is determined with consideration of the light quantities required for the zoom lens and the focus detecting system LA.

A light beam on the optical axis x is reflected by the reflective surface S and the incident surface a of the splitting element LD (reflected twice), and is emitted from the splitting emergent (exit) surface c. Splitting elements LD in the second to fourth exemplary embodiments basically have the same structure as that shown in FIG. 6.

Table 1 shows parameters of the splitting elements LD in the exemplary embodiments. Herein, the optical path length refers to the length from the incident surface a to the splitting emergent (exit) surface c along the optical axis x.

Herein, p, q, d, and optical path length are expressed in millimeters, and $\theta_r$, ξ and $\theta_y$ are expressed in degrees.

TABLE 1

| | p | q | d | $\theta_r$ | ξ | Optical Path Length | $\theta_y$ |
|---|---|---|---|---|---|---|---|
| First Exemplary Embodiment | 16.3 | 36.2 | 16.0 | 65 | 40 | 36.6 | 25 |
| Second Exemplary Embodiment | 17.8 | 81.2 | 23.0 | 55 | 20 | 82.8 | 35 |
| Third Exemplary Embodiment | 16.5 | 77.7 | 23.5 | 55 | 20 | 79.6 | 35 |
| Fourth Exemplary Embodiment | 13.5 | 29.7 | 13.0 | 65 | 40 | 29.7 | 25 |

First to fourth numerical examples corresponding to the above-described first to fourth exemplary embodiments will now be described.

In the numerical examples, i represents the order number of the lens surface from the object side, ri represents the radius of curvature of the corresponding lens surface, di represents the lens thickness and gap between the i-th lens surface and the i+1-th lens surface, and ndi and νdi respectively represent the refractive index and the Abbe number for the d-line. Two or three surfaces closest to the image side are formed of glass blocks such as a face plate.

Aspherical coefficients of the numerical examples will also be shown. The aspherical shape is given by the following expression:

$$X = \frac{(1/R)H^2}{1+\sqrt{1-(1+K)(H/R)^2}} + A2H^2 + A4H^4 + A6H^6 + A8H^8 \qquad (6)$$

where the X-axis indicates the optical axis direction, the H-axis indicates a direction perpendicular to the optical axis, and the light traveling direction is a positive direction. R represents the paraxial radius of curvature, and A2, A4, A6, and A8 are aspherical coefficients.

As various data on the exemplary embodiments, the zoom ratio, focal length, f-number, angle of view, image height, total lens length, back focus BF, exit pupil position, and distances between variable portions in surface data at the focal lengths are also shown. The unit of the zoom ratio, focal length, f-number, image height, total lens length, back focus BF, exit pupil position, and distances between the variable portions in surface data at the focal lengths is mm, and the unit of angle of view is degree. The back focus BF refers to an equivalent air length from the final surface of the zoom lens, excluding the glass block, to a paraxial image plane. The total lens length refers to the sum of the total thickness of the image taking system, excluding the glass block, and the back focus. The exit pupil position refers to a distance from the paraxial image plane to the exit pupil. If the absolute value of this distance is small, white shading occurs.

In the first numerical example, a numerical example of the extender lens unit Ex is also described.

In the first, third, and fourth numerical examples, a surface 41 and a surface 42 respectively represent the incident surface and the emergent (exit) surface of the splitting element LD.

In the second numerical example, a surface 32 and a surface 33 respectively represent the incident surface and the emergent (exit) surface of the splitting element LD.

In the exemplary embodiments, the splitting element LD is provided closer to the object side than the extender lens unit L22 (Ex).

FIRST NUMERICAL EXAMPLE

Unit: mm

Surface Data

| Surface No. | r | d | nd | vd | Effective Diameter |
|---|---|---|---|---|---|
| Object Plane | ∞ | ∞ | | | |
| 1 | 359.00914 | 4.700000 | 1.772499 | 49.6 | 142.986 |
| 2 | 99.08715 | 35.132590 | | | 123.683 |
| 3 | −166.02581 | 4.500000 | 1.772499 | 49.6 | 122.616 |
| 4 | −1358.60530 | 0.150000 | | | 123.141 |
| 5 | 237.23171 | 9.263430 | 1.717362 | 29.5 | 123.067 |
| 6 | 511.56943 | 9.557850 | | | 121.975 |
| 7 | −1374.84122 | 14.802980 | 1.496999 | 81.5 | 120.973 |
| 8 | −153.88221 | 0.200000 | | | 120.527 |
| 9 | −776.30899 | 4.400000 | 1.805177 | 25.4 | 113.487 |
| 10 | 298.18575 | 13.121710 | 1.496999 | 81.5 | 110.147 |
| 11 | −327.96774 | 34.740310 | | | 109.227 |
| 12 | 680.47732 | 17.743790 | 1.496999 | 81.5 | 123.999 |
| 13 | −179.03604 | 0.150000 | | | 124.742 |
| 14 | 219.53309 | 12.988280 | 1.496999 | 81.5 | 123.413 |
| 15 | −1580.26478 | 0.150000 | | | 122.716 |
| 16 | 126.16856 | 9.694320 | 1.620411 | 60.3 | 116.494 |
| 17 | 244.22925 | variable | | | 115.027 |
| 18 | 88.72030 | 1.500000 | 1.882997 | 40.8 | 42.772 |
| 19 | 45.85032 | 6.071050 | | | 40.549 |
| 20 | −326.19278 | 1.500000 | 1.772499 | 49.6 | 40.325 |
| 21 | 114.16204 | 6.047660 | | | 39.867 |
| 22 | −54.32521 | 1.500000 | 1.772499 | 49.6 | 39.900 |
| 23 | −742.51133 | 8.266470 | 1.808095 | 22.8 | 41.775 |
| 24 | −39.84989 | 0.689040 | | | 42.648 |
| 25 | −37.41368 | 1.500000 | 1.816000 | 46.6 | 42.563 |
| 26 | −296.24491 | variable | | | 45.595 |
| 27 | −818.58711 | 5.051940 | 1.498308 | 65.0 | 53.500 |
| 28* | −102.24010 | 0.200000 | | | 54.374 |
| 29 | 270.49552 | 2.500000 | 1.647689 | 33.8 | 56.531 |
| 30 | 60.98272 | 13.037910 | 1.589130 | 61.2 | 57.876 |
| 31 | −154.93738 | 0.200000 | | | 58.501 |
| 32 | 177.53147 | 9.055250 | 1.603112 | 60.7 | 59.107 |
| 33 | −111.93473 | 2.500000 | 1.846658 | 23.9 | 58.954 |
| 34 | −246.08054 | 0.200000 | | | 59.061 |
| 35 | 130.88871 | 8.797580 | 1.487490 | 70.2 | 58.192 |
| 36 | −161.92279 | variable | | | 57.424 |
| 37 | (Stop) | 5.111320 | | | 31.206 |
| 38 | −43.78864 | 1.200000 | 1.729157 | 54.7 | 29.699 |
| 39 | 26.54147 | 3.582650 | 1.846660 | 23.8 | 29.626 |
| 40 | 47.50919 | 3.401520 | | | 29.491 |
| 41 | ∞ | 16.000000 | 1.834807 | 42.7 | 29.913 |
| 42 | ∞ | 5.700440 | | | 33.343 |
| 43 | −47.61573 | 4.804250 | 1.639799 | 34.5 | 34.342 |
| 44 | −29.92456 | 0.200000 | | | 35.518 |
| 45 | 69.12746 | 14.222430 | 1.728250 | 28.5 | 35.481 |
| 46 | −193.01819 | 1.800000 | 1.754998 | 52.3 | 32.954 |
| 47 | 198.97993 | 9.272450 | | | 32.260 |
| 48 | −54.47312 | 1.800000 | 1.882997 | 40.8 | 30.564 |
| 49 | 42.38750 | 10.999800 | 1.625882 | 35.7 | 31.535 |
| 50 | −38.22702 | 0.200000 | | | 32.798 |
| 51 | 598.29737 | 1.800000 | 1.834000 | 37.2 | 32.363 |
| 52 | 25.71112 | 9.169490 | 1.487490 | 70.2 | 31.782 |
| 53 | −91.92891 | 0.200000 | | | 32.418 |
| 54 | 169.66491 | 8.131140 | 1.496999 | 81.5 | 33.030 |
| 55 | −28.52515 | 1.800000 | 1.805181 | 25.4 | 33.229 |
| 56 | −79.31281 | 0.500000 | | | 34.883 |
| 57 | 85.20827 | 8.830930 | 1.487490 | 70.2 | 35.807 |
| 58 | −35.01411 | 5.000000 | | | 35.805 |
| 59 | ∞ | 50.000000 | 1.516330 | 64.2 | 60.000 |
| 60 | ∞ | 10.516590 | | | 60.000 |
| Image Plane | | | | | |

Aspherical Surface Data
28-th surface $K = 0$, $A2 = 2.21807 \times 10^{-7}$, $A4 = 2.81772 \times 10^{-10}$,
$A6 = -3.88958 \times 10^{-13}$, $A8 = 2.11872 \times 10^{-16}$ Various Data
Zoom Ratio 18.5

| | Wide Angle | Intermediate | Telephoto |
|---|---|---|---|
| Focal Length | 7.2000 | 31.7834 | 133.2000 |
| F-number | 1.54 | 1.54 | 1.85 |
| Angle of View | 74.7516 | 19.6352 | 4.7289 |
| Image Height | 5.5 | 5.5 | 5.5 |
| Lens Length | 553.36 | 553.36 | 553.36 |
| BF | 48.49 | 48.49 | 48.49 |
| Exit-Pupil Position | 83.4651 | 83.4651 | 83.4651 |
| d17 | 5.1466 | 75.1466 | 105.3948 |
| d26 | 148.9353 | 62.9802 | 4.4909 |
| d36 | 2.1500 | 18.1051 | 46.3462 |

Extender Lens Unit Ex

| Surface No. | r | d | nd | vd | ea |
|---|---|---|---|---|---|
| 42 | | 0.992700 | | | 33.343 |
| 43 | 48.80767 | 7.132500 | 1.772499 | 49.6 | 34.959 |
| 44 | −64.84394 | 0.196860 | | | 34.773 |
| 45 | 58.45959 | 7.814510 | 1.487490 | 70.2 | 31.363 |
| 46 | −31.53781 | 1.300000 | 1.846660 | 23.8 | 30.135 |
| 47 | −65.22167 | 10.198380 | | 29.231 | |
| 48 | −84.69983 | 2.459270 | 1.922860 | 18.9 | 17.482 |
| 49 | −27.68103 | 0.900000 | 1.882997 | 40.8 | 16.891 |
| 50 | 23.57880 | 5.005350 | | | 15.486 |

Various Data
Zoom Ratio 18.5

| | Wide Angle | Intermediate | Telephoto |
|---|---|---|---|
| Focal Length | 14.0000 | 61.8011 | 259.0000 |
| F-number | 3.00 | 3.00 | 3.60 |
| Angle of View | 42.8955 | 10.1713 | 2.4330 |
| Image Height | 5.5 | 5.5 | 5.5 |
| Total Length | 553.36 | 553.36 | 553.36 |
| BF | 48.49 | 48.49 | 48.49 |

SECOND NUMERICAL EXAMPLE

Unit mm

Surface Data

| Surface No. | r | d | nd | vd | Effective Diameter |
|---|---|---|---|---|---|
| Object Plane | ∞ | ∞ | | | |
| 1 | −251.08815 | 2.000000 | 1.805177 | 25.4 | 82.760 |
| 2 | 157.24947 | 7.215720 | | | 79.120 |
| 3 | 234.98342 | 10.062850 | 1.438750 | 95.0 | 80.321 |

-continued

Unit mm

| | | | | |
|---|---|---|---|---|
| 4 | −158.21146 | 7.144380 | | 80.378 |
| 5 | 162.53780 | 8.510000 | 1.496999 81.5 | 78.487 |
| 6 | −316.01045 | 0.200000 | | 78.127 |
| 7 | 108.34729 | 7.301270 | 1.620411 60.3 | 73.026 |
| 8 | 2254.33439 | 0.200000 | | 72.243 |
| 9 | 61.42653 | 6.649960 | 1.620411 60.3 | 66.364 |
| 10 | 128.52433 | variable | | 65.438 |
| 11* | 78.91221 | 0.800000 | 1.834807 42.7 | 29.905 |
| 12 | 15.76790 | 7.790370 | | 23.759 |
| 13 | −41.83494 | 0.800000 | 1.772499 49.6 | 23.237 |
| 14 | 60.56935 | 1.988280 | | 22.875 |
| 15 | 33.46940 | 5.532780 | 1.846658 23.9 | 23.224 |
| 16 | −41.64637 | 1.172080 | | 22.709 |
| 17 | −28.57279 | 0.800000 | 1.772499 49.6 | 22.026 |
| 18* | 133.16287 | variable | | 21.455 |
| 19 | −27.76457 | 0.800000 | 1.772499 49.6 | 20.252 |
| 20 | 41.76903 | 2.806180 | 1.846658 23.9 | 22.216 |
| 21 | −859.59274 | variable | | 22.728 |
| 22 | (Stop) | 1.000000 | | 25.684 |
| 23 | 80.05227 | 9.445700 | 1.517417 52.4 | 27.408 |
| 24 | −36.47358 | 0.100000 | | 29.279 |
| 25 | 55.02611 | 10.940760 | 1.487490 70.2 | 29.817 |
| 26 | −30.76285 | 1.100000 | 1.882997 40.8 | 29.217 |
| 27 | 78.82958 | 1.426470 | | 30.067 |
| 28 | 109.45704 | 5.973770 | 1.618000 63.3 | 30.760 |
| 29 | −58.57982 | 1.347350 | | 31.497 |
| 30 | 48.60163 | 4.178330 | 1.639799 34.5 | 32.086 |
| 31 | −657.99777 | 1.901180 | | 31.816 |
| 32 | ∞ | 23.000000 | 1.834807 42.7 | 31.002 |
| 33 | ∞ | 5.060570 | | 26.200 |
| 34 | −41.90050 | 1.500000 | 1.882997 40.8 | 24.972 |
| 35 | 33.48553 | 14.704810 | 1.581439 40.8 | 25.547 |
| 36 | −24.48406 | 0.193690 | | 27.770 |
| 37 | −30.86383 | 8.835900 | 1.698947 30.1 | 27.279 |
| 38 | −59.59513 | 6.192570 | | 29.317 |
| 39 | 55.36481 | 1.194440 | 1.882997 40.8 | 29.180 |
| 40 | 28.63952 | 6.679280 | 1.487490 70.2 | 28.394 |
| 41 | −94.69933 | 0.191870 | | 28.328 |
| 42 | 59.51674 | 5.586200 | 1.487490 70.2 | 27.740 |
| 43 | −46.80597 | 1.194440 | 1.882997 40.8 | 27.174 |
| 44 | 169.35216 | 0.191360 | | 26.814 |
| 45 | 35.53785 | 5.535210 | 1.487490 70.2 | 26.722 |
| 46 | −84.22822 | 4.693550 | | 26.173 |
| 47 | ∞ | 30.000000 | 1.603420 38.0 | 40.000 |
| 48 | ∞ | 16.200000 | 1.516330 64.2 | 40.000 |
| 49 | ∞ | 8.293400 | | 40.000 |
| Image Plane | | | | |

Aspherical Surface Data 11-th Surface $K = -3.23637 \times 10^{-2}, A2 = 3.21318 \times 10^{-6}, A4 = -3.97113 \times 10^{-9},$
$A6 = -1.48889 \times 10^{-11}, A8 = 3.06352 \times 10^{-14}$ 18-th Surface $K = -3.66073 \times 10^{-2}, A2 = -1.07011 \times 10^{-7}, A4 = 9.22594 \times 10^{-9},$
$A6 = -1.68952 \times 10^{-10}, A8 = 4.38262 \times 10^{-13}$ Various Data
Zoom Ratio 15.0

| | Wide Angle | Intermediate | Telephoto |
|---|---|---|---|
| Focal Length | 8.5000 | 51.0000 | 127.5000 |
| F-number | 1.70 | 1.70 | 2.00 |
| Angle of View | 65.8105 | 12.3103 | 4.9401 |
| Image Height | 5.5 | 5.5 | 5.5 |
| Lens Length | 289.10 | 289.10 | 289.10 |
| BF | 42.38 | 42.38 | 42.38 |
| Exit-Pupil Position | 79.80 | 79.80 | 79.80 |
| d10 | 1.3174 | 41.5766 | 50.1181 |
| d18 | 51.6507 | 7.3099 | 5.6684 |
| d21 | 4.5000 | 8.5816 | 1.6816 |

THIRD NUMERICAL EXAMPLE

Unit mm

Surface Data

| Surface No. | r | d | nd | vd | Effective Diameter |
|---|---|---|---|---|---|
| Object Plane | ∞ | ∞ | | | |
| 1 | 359.00914 | 4.700000 | 1.772499 | 49.6 | 142.986 |
| 2 | 99.08715 | 35.132590 | | | 123.683 |
| 3 | −166.02581 | 4.500000 | 1.772499 | 49.6 | 122.616 |
| 4 | −1358.60530 | 0.150000 | | | 123.141 |
| 5 | 237.23171 | 9.263430 | 1.717362 | 29.5 | 123.067 |
| 6 | 511.56943 | 9.557850 | | | 121.975 |
| 7 | −1374.84122 | 14.802980 | 1.496999 | 81.5 | 120.973 |
| 8 | −153.88221 | 0.200000 | | | 120.527 |
| 9 | −776.30899 | 4.400000 | 1.805177 | 25.4 | 113.487 |
| 10 | 298.18575 | 13.121710 | 1.496999 | 81.5 | 110.147 |
| 11 | −327.96774 | 34.740310 | | | 109.227 |
| 12 | 680.47732 | 17.743790 | 1.496999 | 81.5 | 123.999 |
| 13 | −179.03604 | 0.150000 | | | 124.742 |
| 14 | 219.53309 | 12.988280 | 1.496999 | 81.5 | 123.413 |
| 15 | −1580.26478 | 0.150000 | | | 122.716 |
| 16 | 126.16856 | 9.694320 | 1.620411 | 60.3 | 116.494 |
| 17 | 244.22925 | variable | | | 115.027 |
| 18 | 88.72030 | 1.500000 | 1.882997 | 40.8 | 42.772 |
| 19 | 45.85032 | 6.071050 | | | 40.549 |
| 20 | −326.19278 | 1.500000 | 1.772499 | 49.6 | 40.325 |
| 21 | 114.16204 | 6.047660 | | | 39.867 |
| 22 | −54.32521 | 1.500000 | 1.772499 | 49.6 | 39.900 |
| 23 | −742.51133 | 8.266470 | 1.808095 | 22.8 | 41.775 |
| 24 | −39.84989 | 0.689040 | | | 42.648 |
| 25 | −37.41368 | 1.500000 | 1.816000 | 46.6 | 42.563 |
| 26 | −296.24491 | variable | | | 45.595 |
| 27 | −818.58711 | 5.051940 | 1.498308 | 65.0 | 53.500 |
| 28* | −102.24010 | 0.200000 | | | 54.374 |
| 29 | 270.49552 | 2.500000 | 1.647689 | 33.8 | 56.531 |
| 30 | 60.98272 | 13.037910 | 1.589130 | 61.2 | 57.876 |
| 31 | −154.93738 | 0.200000 | | | 58.501 |
| 32 | 177.53147 | 9.055250 | 1.603112 | 60.7 | 59.107 |
| 33 | −111.93473 | 2.500000 | 1.846658 | 23.9 | 58.954 |
| 34 | −246.08054 | 0.200000 | | | 59.061 |
| 35 | 130.88871 | 8.797580 | 1.487490 | 70.2 | 58.192 |
| 36 | −161.92279 | variable | | | 57.424 |
| 37 | (Stop) | 0.00000 | 3.164520 | | 31.206 |
| 38 | −62.92697 | 1.500000 | 1.729157 | 54.7 | 30.429 |
| 39 | 32.68876 | 3.385450 | 1.846660 | 23.8 | 29.672 |
| 40 | 66.95559 | 2.643470 | | | 29.427 |
| 41 | ∞ | 23.500000 | 1.516330 | 64.1 | 29.501 |
| 42 | ∞ | 4.564010 | | | 30.626 |
| 43 | −40.04675 | 1.800000 | 1.754998 | 52.3 | 30.735 |
| 44 | 90.16286 | 7.439160 | 1.728250 | 28.5 | 33.247 |
| 45 | −38.41314 | 0.200000 | | | 34.023 |
| 46 | −323.54230 | 18.775630 | 1.639799 | 34.5 | 34.001 |
| 47 | −607.45802 | 4.221430 | | | 34.718 |
| 48 | −321.39770 | 1.800000 | 1.754998 | 52.3 | 34.819 |
| 49 | 29.17435 | 11.454750 | 1.548141 | 45.8 | 35.322 |
| 50 | −43.98989 | 0.200000 | | | 35.814 |
| 51 | 62.16780 | 1.800000 | 1.834000 | 37.2 | 35.613 |
| 52 | 27.68644 | 7.545910 | 1.487490 | 70.2 | 34.155 |
| 53 | −978.50024 | 0.200000 | | | 34.154 |
| 54 | 308.53633 | 8.202270 | 1.496999 | 81.5 | 34.138 |
| 55 | −30.25492 | 1.800000 | 1.805181 | 25.4 | 34.015 |
| 56 | −208.90378 | 0.500000 | | | 35.211 |
| 57 | 89.57246 | 10.195330 | 1.487490 | 70.2 | 35.843 |
| 58 | −34.84253 | 5.000000 | | | 35.852 |
| 59 | ∞ | 50.000000 | 1.516330 | 64.2 | 60.000 |
| 60 | ∞ | 10.518220 | | | 60.000 |
| Image Plane | ∞ | | | | |

-continued

Unit mm

Aspherical Surface Data
28-th Surface

K = 0, A2 = 2.21807 × $10^{-7}$, A4 = 2.81772 × $10^{-10}$,
A6 = −3.88958 × $10^{-13}$, A8 = 2.11872 × $10^{-16}$

Various Data
Zoom Ratio 18.5

| | Wide Angle | Intermediate | Telephoto |
|---|---|---|---|
| Focal Length | 7.2000 | 31.7834 | 133.2000 |
| F-number | 1.54 | 1.54 | 1.85 |
| Angle of View | 74.7516 | 19.6352 | 4.7289 |
| Image Height | 5.5 | 5.5 | 5.5 |
| Lens Length | 559.53 | 559.53 | 559.53 |
| BF | 48.49 | 48.49 | 48.49 |
| Exit-Pupil Position | 81.14 | 81.14 | 81.14 |
| d17 | 5.1466 | 75.1466 | 105.3948 |
| d26 | 148.9353 | 62.9802 | 4.4909 |
| d36 | 2.1500 | 18.1051 | 46.3462 |

FOURTH NUMERICAL EXAMPLE

Unit mm

Surface Data

| Surface No. | r | d | nd | vd | Effective Diameter |
|---|---|---|---|---|---|
| Object Plane | ∞ | ∞ | | | |
| 1 | 359.00914 | 4.700000 | 1.772499 | 49.6 | 142.986 |
| 2 | 99.08715 | 35.132590 | | | 123.683 |
| 3 | −166.02581 | 4.500000 | 1.772499 | 49.6 | 122.616 |
| 4 | −1358.60530 | 0.150000 | | | 123.141 |
| 5 | 237.23171 | 9.263430 | 1.717362 | 29.5 | 123.067 |
| 6 | 511.56943 | 9.557850 | | | 121.975 |
| 7 | −1374.84122 | 14.802980 | 1.496999 | 81.5 | 120.973 |
| 8 | −153.88221 | 0.200000 | | | 120.527 |
| 9 | −776.30899 | 4.400000 | 1.805177 | 25.4 | 113.487 |
| 10 | 298.18575 | 13.121710 | 1.496999 | 81.5 | 110.147 |
| 11 | −327.96774 | 34.740310 | | | 109.227 |
| 12 | 680.47732 | 17.743790 | 1.496999 | 81.5 | 123.999 |
| 13 | −179.03604 | 0.150000 | | | 124.742 |
| 14 | 219.53309 | 12.988280 | 1.496999 | 81.5 | 123.413 |
| 15 | −1580.26478 | 0.150000 | | | 122.716 |
| 16 | 126.16856 | 9.694320 | 1.620411 | 60.3 | 116.494 |
| 17 | 244.22925 | variable | | | 115.027 |
| 18 | 88.72030 | 1.500000 | 1.882997 | 40.8 | 42.772 |
| 19 | 45.85032 | 6.071050 | | | 40.549 |
| 20 | −326.19278 | 1.500000 | 1.772499 | 49.6 | 40.325 |
| 21 | 114.16204 | 6.047660 | | | 39.867 |
| 22 | −54.32521 | 1.500000 | 1.772499 | 49.6 | 39.900 |
| 23 | −742.51133 | 8.266470 | 1.808095 | 22.8 | 41.775 |
| 24 | −39.84989 | 0.689040 | | | 42.648 |
| 25 | −37.41368 | 1.500000 | 1.816000 | 46.6 | 42.563 |
| 26 | −296.24491 | variable | | | 45.595 |
| 27 | −818.58711 | 5.051940 | 1.498308 | 65.0 | 53.500 |
| 28* | −102.24010 | 0.200000 | | | 54.374 |
| 29 | 270.49552 | 2.500000 | 1.647689 | 33.8 | 56.531 |
| 30 | 60.98272 | 13.037910 | 1.589130 | 61.2 | 57.876 |
| 31 | −154.93738 | 0.200000 | | | 58.501 |
| 32 | 177.53147 | 9.055250 | 1.603112 | 60.7 | 59.107 |
| 33 | −111.93473 | 2.500000 | 1.846658 | 23.9 | 58.954 |
| 34 | −246.08054 | 0.200000 | | | 59.061 |
| 35 | 130.88871 | 8.797580 | 1.487490 | 70.2 | 58.192 |
| 36 | −161.92279 | variable | | | 57.424 |
| 37 | (Stop) | 0.00000 | | 2.481330 | 26.097 |
| 38 | −51.08895 | 1.000000 | 1.754998 | 52.3 | 25.682 |
| 39 | 41.86696 | 1.721680 | 1.846660 | 23.8 | 25.498 |
| 40 | 56.64312 | 2.458280 | | | 25.415 |
| 41 | ∞ | 13.000000 | 1.834807 | 42.7 | 25.687 |
| 42 | ∞ | 8.832920 | | | 27.573 |
| 43 | −43.64663 | 7.268220 | 1.639799 | 34.5 | 29.267 |
| 44 | −33.29682 | 0.200000 | | | 31.789 |
| 45 | 91.68398 | 18.599190 | 1.728250 | 28.5 | 32.044 |
| 46 | −42.65731 | 2.500000 | 1.754998 | 52.3 | 30.258 |
| 47 | −95.00379 | 12.612140 | | | 29.801 |
| 48 | −31.99058 | 2.500000 | 1.882997 | 40.8 | 24.651 |
| 49 | 41.91431 | 10.909790 | 1.625882 | 35.7 | 25.818 |
| 50 | −26.19159 | 0.200000 | | | 27.339 |
| 51 | −331.33226 | 2.500000 | 1.834000 | 37.2 | 26.300 |
| 52 | 24.32047 | 8.833690 | 1.487490 | 70.2 | 25.588 |
| 53 | −166.41018 | 0.200000 | | | 26.314 |
| 54 | 161.46012 | 10.423480 | 1.496999 | 81.5 | 26.509 |
| 55 | −21.88462 | 2.500000 | 1.805181 | 25.4 | 26.760 |
| 56 | −54.25260 | 0.500000 | | | 28.287 |
| 57 | 98.91779 | 7.743550 | 1.487490 | 70.2 | 28.622 |
| 58 | −33.54696 | 5.000000 | | | 28.515 |
| 59 | ∞ | 50.000000 | 1.516330 | 64.2 | 60.000 |
| 60 | ∞ | 10.520360 | | | 60.000 |
| Image Plane | ∞ | | | | |

Aspherical Surface Data
28-th Surface

K = 0, A2 = 2.21807 × $10^{-7}$, A4 = 2.81772 × $10^{-10}$,
A6 = −3.88958 × $10^{-13}$, A8 = 2.11872 × $10^{-16}$

Various Data
Zoom Ratio 18.5

| | Wide Angle | Intermediate | Telephoto |
|---|---|---|---|
| Focal Length | 7.2000 | 31.7834 | 133.2000 |
| F-number | 1.85 | 1.85 | 1.85 |
| Angle of View | 74.7521 | 19.6353 | 4.7290 |
| Image Height | 5.5 | 5.5 | 5.5 |
| Lens Length | 561.62 | 561.62 | 561.62 |
| BF | 48.49 | 48.49 | 48.49 |
| Exit-Pupil Position | 79.9989 | 79.9989 | 79.9989 |
| d17 | 5.1466 | 75.1466 | 105.3948 |
| d26 | 148.9353 | 62.9802 | 4.4909 |
| d36 | 2.1500 | 18.1051 | 46.3462 |

Table 2 shows the relationships between the parameters of the zoom lenses in the first to fourth numerical examples and Conditional Expressions 1 to 5. In Conditional Expression 1, $d_T$ is a value converted into a distance in the air (equivalent air value). In Table 2, the f-number represents the f-number of the zoom lens that can detect the in-focus position by the focus detecting system LA. As long as the refractive power of the optical system in the focus detecting system LA is constant, the focusing accuracy increases as the f-number increases.

In the phase difference method, the in-focus position is detected by using a light beam having the above-described f-number. For this reason, if the light beam having the f-number is blocked by stopping-down, detection of the in-focus position is impossible. In other words, it is preferable to set the f-number at a small value, because blocking of the light beam due to stopping-down is suppressed, and stable auto focusing can be performed. In particular, in a movie taking system, as in the exemplary embodiments, it is preferable to set the f-number small so as to reduce the influence of stopping-down and to stably perform auto focusing.

Accordingly, when the in-focus position is detected by the phase difference method, it is preferable to set the f-number within a range of 4 to 22, with consideration of focusing accuracy and stable auto focusing, as described above.

TABLE 2

|  | Conditional Expression 1 | Conditional Expression 2 | Conditional Expression 3 | Conditional Expression 4 | Conditional Expression 5 | F-number |
|---|---|---|---|---|---|---|
| First Numerical Example | 0.19 | 0.33 | 0.20 | 0.12 | 65 | 22 |
| Second Numerical Example | 0.38 | 0.64 | −0.19 | 0.20 | 55 | 4 |
| Third Numerical Example | 0.21 | 0.75 | 0.04 | 0.14 | 55 | 5.6 |
| Fourth Numerical Example | 0.12 | 0.28 | 0.13 | 0.08 | 65 | 22 |

The first numerical example is characterized in that the values are close to the upper limits in Conditional Expressions 3 and 5 and the lower limit in Conditional Expression 4.

The second numerical example is characterized in that the values are close to the upper limit in Conditional Expression 1 and the lower limits in Conditional Expressions 3 and 5.

The third numerical example is characterized in that the values are close to the upper limit in Conditional Expressions 2 and the lower limits in Conditional Expressions 3 and 5.

The fourth numerical example is characterized in that the values are close to the lower limits in Conditional Expressions 1 and 4 and the upper limit in Conditional Expression 5.

If the value comes out of the range of Conditional Expression 3, the converted inclination at which the axial marginal ray enters the lens unit L22 increases, and the decentration sensitivity of the lens unit L22 to shift of the optical axis on the image plane and decentration aberration increases. This deteriorates a taken image when the lens unit L22 and the extender lens Ex are exchanged, complicates the mechanism for preventing deterioration, and makes adjustment difficult during manufacturing.

For example, in the first numerical example, when the lens unit L22 is decentered in parallel by 0.1 mm, the amount of shift of the optical axis on the image plane is 0.086 mm.

In the first to fourth numerical examples, macro image taking and adjustment of the flange back are performed by driving the entire imaging lens unit L23 along the optical axis.

The exemplary embodiments described above can provide a small and light-weight zoom lens having an autofocus function of accurately detecting the in-focus position while maintaining high optical performance.

Further, the exemplary embodiments can provide a zoom lens that can prevent the total lens length from being increased when a part of an image taking beam is split by a splitting element provided in an image taking optical path.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-199093 filed Jul. 31, 2007, which is hereby incorporated by reference herein in its entirety.

What is claimed is:

1. A zoom lens comprising:
a focus unit including a focus lens unit;
a zoom unit including a zoom lens unit;
an aperture stop configured to adjust a light quantity; and
an imaging unit including a lens unit that does not move for zooming and a splitting element,
wherein the focus unit, the zoom unit, the aperture stop, and the imaging unit are arranged in that order from an object side to an image side,
wherein the splitting element includes:
an incident surface on which a light beam from the aperture stop is incident;
a half mirror surface configured to split the light beam from the incident surface into reflected light and transmitted light;
a splitting exit surface from which the reflected light from the half mirror surface is emitted after being reflected by a part of the incident surface; and
an exit surface from which the transmitted light passing through the half mirror surface is emitted,
wherein the incident surface and the exit surface are perpendicular to an optical axis of the zoom lens, and
wherein the following conditions are satisfied:

$$0.1 < \frac{d_P}{d_T} < 0.4 \quad (1)$$

$$0.25 < \frac{D_C}{D_B} < 0.77 \quad (2)$$

where $d_P$ represents a distance from the aperture stop to the exit surface of the splitting element, $d_T$ represents an equivalent air length from the aperture stop to an image plane of the entire zoom lens, $D_B$ represents an effective diameter of the exit surface of the splitting element, and $D_C$ represents an effective diameter of the splitting exit surface of the splitting element.

2. The zoom lens according to claim 1,
wherein the imaging unit further includes:
a front lens unit including the splitting element;
a lens unit that is insertable into and removable from an optical path, and an extender lens that is insertable into the optical path in exchange for the lens unit so as to change a focal length range of the entire zoom lens; and an imaging lens unit that does not move for focusing or zooming, and wherein the front lens unit, the lens unit or the extender lens, and the imaging lens unit are arranged in that order from the object side to the image side.

3. The zoom lens according to claim 1, further comprising:
a focus detecting element configured to detect a focus state of the zoom lens; and
a focus lens unit provided on an exit side of the splitting exit surface and configured to guide the reflected light emitted from the splitting exit surface to the focus detecting element.

4. The zoom lens according to claim 2, wherein the imaging lens unit is movable along the optical axis so as to perform at least one of macro image taking and adjustment of a flange back.

5. An image taking system comprising:
a camera body including an image pickup element; and
the zoom lens according to claim 1, the zoom lens guiding light from a subject to the image pickup element.

6. The image taking system according to claim 5, wherein the following conditions are satisfied:

$$-0.21 < \alpha < 0.22 \tag{3}$$

$$0.05 < \frac{d_P \cdot \tan\overline{\alpha}}{D_B} < 0.22 \tag{4}$$

$$53 < \theta_r < 67 \tag{5}$$

where $\alpha$ represents an incident angle of an axial marginal ray on the splitting element, $\overline{\alpha}$ represents an incident angle of a principal ray on the maximum image height of the splitting element when the aperture stop is open, and $\theta_r$ represents an angle in degrees formed by the optical axis and the half mirror surface in a clockwise direction.

* * * * *